(12) United States Patent
Terayama

(10) Patent No.: US 7,791,803 B2
(45) Date of Patent: Sep. 7, 2010

(54) ANTIREFLECTION FILM, OPTICAL ELEMENT AND OPTICAL SYSTEM

(75) Inventor: Etsuo Terayama, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 436 days.

(21) Appl. No.: 12/034,474

(22) Filed: Feb. 20, 2008

(65) Prior Publication Data

US 2008/0231957 A1    Sep. 25, 2008

(30) Foreign Application Priority Data

Mar. 22, 2007    (JP)    ............................ P2007-074530

(51) Int. Cl.
G02B 1/10    (2006.01)
G02B 5/28    (2006.01)

(52) U.S. Cl. ........................ 359/588; 359/586; 359/580; 359/570; 428/428

(58) Field of Classification Search ................. 359/580, 359/586, 587, 588, 589; 428/428
See application file for complete search history.

(56) References Cited

U.S. PATENT DOCUMENTS

| 3,809,459 | A | | 5/1974 | Wakamiya et al. | |
| 4,726,654 | A | * | 2/1988 | Kimura et al. | ............... 359/588 |
| 5,532,871 | A | * | 7/1996 | Hashimoto et al. | ........... 359/359 |
| 5,582,919 | A | * | 12/1996 | Ikadai et al. | ................. 428/428 |
| 6,472,087 | B1 | * | 10/2002 | Otani et al. | ................. 428/696 |
| 6,574,039 | B1 | * | 6/2003 | Murata et al. | ............... 359/359 |

FOREIGN PATENT DOCUMENTS

| DE | 1936091 | 1/1971 |
| JP | 2001-74903 A | 3/2001 |
| JP | 2006-284656 A | 10/2006 |
| WO | WO-98/56044 A1 | 12/1998 |

OTHER PUBLICATIONS

Liou, "Designing a Broadband Visible Antireflection Coating by Flip-Flop Tuning Search Technique," Jpn. J. Appl. Phys., vol. 42, 2003, pp. 6879-6882, XP-002428367.
Chinese Office Action for corresponding Chinese Application No. 200810074202.5 isued Jul. 24, 2009.

* cited by examiner

*Primary Examiner*—Audrey Y Chang
(74) *Attorney, Agent, or Firm*—Birch, Stewart, Kolasch & Birch, LLP

(57) ABSTRACT

An antireflection film includes a multilayer film having six layers, in total, provided between an optical substrate and an adhesion layer. The respective layers of first to sixth layers are laminated in order from one side of the adhesion layer. A refractive index of the antireflection film as a whole is lower than that of the optical substrate and higher than that of the adhesion layer. The first and third layers are low refractive index layers having a refractive index of 1.35 to 1.50 at d line. The second, fourth and sixth layers are middle refractive index layers having a refractive index of 1.55 to 1.85 at the d line. The fifth layer is a high refractive index layer having a refractive index, at the d line, that is in a range of 1.70 to 2.50 and that is higher than that of the middle refractive index layer.

10 Claims, 41 Drawing Sheets

FIG. 4 (A)

EXAMPLE 1-1

CENTER WAVELENGTH λ0 = 520nm

| | CONSTITUENT MATERIAL | REFRACTIVE INDEX N | PHYSICAL THICKNESS d | OPTICAL THICKNESS 4n x d | OPTICAL THICKNESS n x d | |
|---|---|---|---|---|---|---|
| OPTICAL SUBSTRATE | S-LAH79 | 2.0033 | — | — | — | |
| 6th LAYER | al2o3 | 1.6376 | 19.933 | 130.569 | 32.64228 | 0.063 λ0 |
| 5th LAYER | sub-h4 | 2.0927 | 21.550 | 180.391 | 45.09769 | 0.087 λ0 |
| 4th LAYER | al2o3 | 1.6376 | 100.271 | 656.815 | 164.2038 | 0.316 λ0 |
| 3rd LAYER | sio2 | 1.4671 | 60.137 | 352.908 | 88.22699 | 0.170 λ0 |
| 2nd LAYER | al2o3 | 1.6376 | 22.973 | 150.482 | 37.62058 | 0.072 λ0 |
| 1st LAYER | sio2 | 1.4671 | 39.046 | 229.138 | 57.28439 | 0.110 λ0 |
| ADHESION LAYER | EPOXY RESIN | 1.5520 | — | — | — | |

FIG. 5 (A)
EXAMPLE 1-2

CENTER WAVELENGTH λ0 = 520nm

| | CONSTITUENT MATERIAL | REFRACTIVE INDEX N | PHYSICAL THICKNESS d | OPTICAL THICKNESS 4n x d | OPTICAL THICKNESS n x d |
|---|---|---|---|---|---|
| OPTICAL SUBSTRATE | S-NPH2 | 1.9229 | — | — | — |
| 6th LAYER | al2o3 | 1.6376 | 23.244 | 152.257 | 0.073 λ0 |
| 5th LAYER | sub-h4 | 2.0927 | 17.646 | 147.711 | 0.071 λ0 |
| 4th LAYER | al2o3 | 1.6376 | 109.297 | 715.939 | 0.344 λ0 |
| 3rd LAYER | sio2 | 1.4671 | 47.451 | 278.461 | 0.134 λ0 |
| 2nd LAYER | al2o3 | 1.6376 | 28.240 | 184.983 | 0.089 λ0 |
| 1st LAYER | sio2 | 1.4671 | 33.600 | 197.178 | 0.095 λ0 |
| ADHESION LAYER | EPOXY RESIN | 1.5520 | — | — | — |

FIG. 6 (A)
EXAMPLE 1-3

CENTER WAVELENGTH λ0 = 520nm

| | CONSTITUENT MATERIAL | REFRACTIVE INDEX N | PHYSICAL THICKNESS d | OPTICAL THICKNESS 4n × d | OPTICAL THICKNESS n × d |
|---|---|---|---|---|---|
| OPTICAL SUBSTRATE | LASF-N17 | 1.8830 | — | — | — |
| 6th LAYER | al2o3 | 1.6376 | 23.287 | 152.539 | 0.073 λ0 |
| 5th LAYER | sub-h4 | 2.0927 | 14.627 | 122.440 | 0.059 λ0 |
| 4th LAYER | al2o3 | 1.6376 | 107.780 | 706.002 | 0.339 λ0 |
| 3rd LAYER | sio2 | 1.4671 | 45.905 | 269.389 | 0.130 λ0 |
| 2nd LAYER | al2o3 | 1.6376 | 28.688 | 187.918 | 0.090 λ0 |
| 1st LAYER | sio2 | 1.4671 | 33.600 | 197.178 | 0.095 λ0 |
| ADHESION LAYER | EPOXY RESIN | 1.5520 | | | — |

FIG. 7 (A)
EXAMPLE 1-4

CENTER WAVELENGTH λ0 = 520nm

| | CONSTITUENT MATERIAL | REFRACTIVE INDEX N | PHYSICAL THICKNESS d | OPTICAL THICKNESS 4n x d | OPTICAL THICKNESS n x d | |
|---|---|---|---|---|---|---|
| OPTICAL SUBSTRATE | S-TIH53 | 1.8467 | — | — | — | |
| 6th LAYER | al2o3 | 1.6376 | 24.765 | 162.221 | 40.55516 | 0.078 λ0 |
| 5th LAYER | sub-h4 | 2.0927 | 13.430 | 112.420 | 28.10496 | 0.054 λ0 |
| 4th LAYER | al2o3 | 1.6376 | 112.012 | 733.723 | 183.4309 | 0.353 λ0 |
| 3rd LAYER | sio2 | 1.4671 | 42.775 | 251.021 | 62.7552 | 0.121 λ0 |
| 2nd LAYER | al2o3 | 1.6376 | 29.924 | 196.014 | 49.00354 | 0.094 λ0 |
| 1st LAYER | sio2 | 1.4671 | 33.600 | 197.178 | 49.29456 | 0.095 λ0 |
| ADHESION LAYER | EPOXY RESIN | 1.5520 | — | — | — | |

FIG. 8 (A)
EXAMPLE 1-5

CENTER WAVELENGTH λ0 = 520nm

| | CONSTITUENT MATERIAL | REFRACTIVE INDEX N | PHYSICAL THICKNESS d | OPTICAL THICKNESS 4n x d | OPTICAL THICKNESS n x d | |
|---|---|---|---|---|---|---|
| OPTICAL SUBSTRATE | SFL6 | 1.8052 | — | — | — | |
| 6th LAYER | al2o3 | 1.6376 | 25.713 | 168.430 | 42.10761 | 0.081 λ0 |
| 5th LAYER | sub-h4 | 2.0927 | 11.500 | 96.264 | 24.06605 | 0.046 λ0 |
| 4th LAYER | al2o3 | 1.6376 | 115.268 | 755.052 | 188.7629 | 0.363 λ0 |
| 3rd LAYER | sio2 | 1.4671 | 40.707 | 238.885 | 59.72124 | 0.115 λ0 |
| 2nd LAYER | al2o3 | 1.6376 | 30.866 | 202.185 | 50.54616 | 0.097 λ0 |
| 1st LAYER | sio2 | 1.4671 | 33.600 | 197.178 | 49.29456 | 0.095 λ0 |
| ADHESION LAYER | EPOXY RESIN | 1.5520 | — | — | — | |

FIG. 9 (A)
EXAMPLE 1-6

CENTER WAVELENGTH λ0 = 520nm

| | CONSTITUENT MATERIAL | REFRACTIVE INDEX N | PHYSICAL THICKNESS d | OPTICAL THICKNESS 4n x d | OPTICAL THICKNESS n x d | |
|---|---|---|---|---|---|---|
| OPTICAL SUBSTRATE | SF14 | 1.7618 | — | — | — | |
| 6th LAYER | al2o3 | 1.6376 | 27.228 | 178.354 | 44.58857 | 0.086 λ0 |
| 5th LAYER | sub-h4 | 2.0927 | 11.500 | 96.264 | 24.06605 | 0.046 λ0 |
| 4th LAYER | al2o3 | 1.6376 | 117.692 | 770.930 | 192.7324 | 0.371 λ0 |
| 3rd LAYER | sio2 | 1.4671 | 43.401 | 254.694 | 63.67361 | 0.122 λ0 |
| 2nd LAYER | al2o3 | 1.6376 | 30.898 | 202.394 | 50.59856 | 0.097 λ0 |
| 1st LAYER | sio2 | 1.4671 | 33.600 | 197.178 | 49.29456 | 0.095 λ0 |
| ADHESION LAYER | EPOXY RESIN | 1.5520 | — | — | — | |

EXAMPLES 1-1 TO 1-6 (SIX-LAYER CONFIGURATION)

FIG. 11 (A)
EXAMPLE 2-1

CENTER WAVELENGTH λ0 = 520nm

| | CONSTITUENT MATERIAL | REFRACTIVE INDEX N | PHYSICAL THICKNESS d | OPTICAL THICKNESS 4n × d | OPTICAL THICKNESS n × d |
|---|---|---|---|---|---|
| OPTICAL SUBSTRATE | S-LAH79 | 2.0033 | — | — | — |
| 8th LAYER | al2o3 | 1.6376 | 13.259 | 86.852 | 0.042 λ0 |
| 7th LAYER | sub-h4 | 2.0927 | 32.507 | 272.110 | 0.131 λ0 |
| 6th LAYER | al2o3 | 1.6376 | 37.325 | 244.494 | 0.118 λ0 |
| 5th LAYER | sub-h4 | 2.0927 | 18.824 | 157.572 | 0.076 λ0 |
| 4th LAYER | al2o3 | 1.6376 | 121.981 | 799.024 | 0.384 λ0 |
| 3rd LAYER | sio2 | 1.4671 | 41.838 | 245.522 | 0.118 λ0 |
| 2nd LAYER | al2o3 | 1.6376 | 34.130 | 223.565 | 0.107 λ0 |
| 1st LAYER | sio2 | 1.4671 | 33.600 | 197.178 | 0.095 λ0 |
| ADHESION LAYER | EPOXY RESIN | 1.5520 | — | — | — |

FIG. 12 (A)

EXAMPLE 2-2

CENTER WAVELENGTH λ0 = 520nm

| | CONSTITUENT MATERIAL | REFRACTIVE INDEX N | PHYSICAL THICKNESS d | OPTICAL THICKNESS 4n×d | OPTICAL THICKNESS n×d | |
|---|---|---|---|---|---|---|
| OPTICAL SUBSTRATE | S-NPH2 | 1.9229 | — | — | — | |
| 8th LAYER | al2o3 | 1.6376 | 17.394 | 113.938 | 28.48441 | 0.055 λ0 |
| 7th LAYER | sub-h4 | 2.0927 | 25.422 | 212.802 | 53.20062 | 0.102 λ0 |
| 6th LAYER | al2o3 | 1.6376 | 43.918 | 287.680 | 71.92012 | 0.138 λ0 |
| 5th LAYER | sub-h4 | 2.0927 | 15.588 | 130.484 | 32.62101 | 0.063 λ0 |
| 4th LAYER | al2o3 | 1.6376 | 125.418 | 821.538 | 205.3845 | 0.395 λ0 |
| 3rd LAYER | sio2 | 1.4671 | 38.599 | 226.514 | 56.62859 | 0.109 λ0 |
| 2nd LAYER | al2o3 | 1.6376 | 35.387 | 231.799 | 57.94975 | 0.111 λ0 |
| 1st LAYER | sio2 | 1.4671 | 33.600 | 197.178 | 49.29456 | 0.095 λ0 |
| ADHESION LAYER | EPOXY RESIN | 1.5520 | — | — | — | |

FIG. 13 (A)
EXAMPLE 2-3

CENTER WAVELENGTH λ0 = 520nm

| | CONSTITUENT MATERIAL | REFRACTIVE INDEX N | PHYSICAL THICKNESS d | OPTICAL THICKNESS 4n x d | OPTICAL THICKNESS n x d |
|---|---|---|---|---|---|
| OPTICAL SUBSTRATE | LASF-N17 | 1.8830 | — | — | — |
| 8th LAYER | al2o3 | 1.6376 | 15.922 | 104.295 | 0.050 λ0 |
| 7th LAYER | sub-h4 | 2.0927 | 21.147 | 177.017 | 0.085 λ0 |
| 6th LAYER | al2o3 | 1.6376 | 43.340 | 283.894 | 0.136 λ0 |
| 5th LAYER | sub-h4 | 2.0927 | 15.028 | 125.796 | 0.060 λ0 |
| 4th LAYER | al2o3 | 1.6376 | 125.768 | 823.831 | 0.396 λ0 |
| 3rd LAYER | sio2 | 1.4671 | 38.311 | 224.824 | 0.108 λ0 |
| 2nd LAYER | al2o3 | 1.6376 | 35.487 | 232.454 | 0.112 λ0 |
| 1st LAYER | sio2 | 1.4671 | 33.600 | 197.178 | 0.095 λ0 |
| ADHESION LAYER | EPOXY RESIN | 1.5520 | — | — | — |

FIG. 14 (A)
EXAMPLE 2-4

CENTER WAVELENGTH λ0 = 520nm

| | CONSTITUENT MATERIAL | REFRACTIVE INDEX N | PHYSICAL THICKNESS d | OPTICAL THICKNESS 4n x d | OPTICAL THICKNESS n x d |
|---|---|---|---|---|---|
| OPTICAL SUBSTRATE | S-TIH53 | 1.8467 | — | — | — |
| 8th LAYER | al2o3 | 1.6376 | 19.336 | 126.659 | 0.061 λ0 |
| 7th LAYER | sub-h4 | 2.0927 | 18.684 | 156.400 | 0.075 λ0 |
| 6th LAYER | al2o3 | 1.6376 | 48.154 | 315.428 | 0.152 λ0 |
| 5th LAYER | sub-h4 | 2.0927 | 12.875 | 107.774 | 0.052 λ0 |
| 4th LAYER | al2o3 | 1.6376 | 129.171 | 846.122 | 0.407 λ0 |
| 3rd LAYER | sio2 | 1.4671 | 35.785 | 210.001 | 0.101 λ0 |
| 2nd LAYER | al2o3 | 1.6376 | 36.683 | 240.288 | 0.116 λ0 |
| 1st LAYER | sio2 | 1.4671 | 33.600 | 197.178 | 0.095 λ0 |
| ADHESION LAYER | EPOXY RESIN | 1.5520 | — | — | — |

FIG. 15 (A)
EXAMPLE 2-5

CENTER WAVELENGTH λ0 = 520nm

| | CONSTITUENT MATERIAL | REFRACTIVE INDEX N | PHYSICAL THICKNESS d | OPTICAL THICKNESS 4n×d | OPTICAL THICKNESS n×d |
|---|---|---|---|---|---|
| OPTICAL SUBSTRATE | SFL6 | 1.8052 | — | — | — |
| 8th LAYER | al2o3 | 1.6376 | 20.752 | 135.934 | 0.065 λ0 |
| 7th LAYER | sub-h4 | 2.0927 | 15.535 | 130.040 | 0.063 λ0 |
| 6th LAYER | al2o3 | 1.6376 | 51.411 | 336.763 | 0.162 λ0 |
| 5th LAYER | sub-h4 | 2.0927 | 11.500 | 96.264 | 0.046 λ0 |
| 4th LAYER | al2o3 | 1.6376 | 131.918 | 864.116 | 0.415 λ0 |
| 3rd LAYER | sio2 | 1.4671 | 34.701 | 203.639 | 0.098 λ0 |
| 2nd LAYER | al2o3 | 1.6376 | 37.354 | 244.684 | 0.118 λ0 |
| 1st LAYER | sio2 | 1.4671 | 33.600 | 197.178 | 0.095 λ0 |
| ADHESION LAYER | EPOXY RESIN | 1.5520 | — | — | — |

FIG. 16 (A)
EXAMPLE 2-6

CENTER WAVELENGTH λ0 = 520nm

| | CONSTITUENT MATERIAL | REFRACTIVE INDEX N | PHYSICAL THICKNESS d | OPTICAL THICKNESS 4n x d | OPTICAL THICKNESS n x d | |
|---|---|---|---|---|---|---|
| OPTICAL SUBSTRATE | SF14 | 1.7618 | — | — | — | |
| 8th LAYER | al2o3 | 1.6376 | 21.895 | 143.421 | 35.85525 | 0.069 λ0 |
| 7th LAYER | sub-h4 | 2.0927 | 13.850 | 115.936 | 28.9839 | 0.056 λ0 |
| 6th LAYER | al2o3 | 1.6376 | 54.992 | 360.220 | 90.0549 | 0.173 λ0 |
| 5th LAYER | sub-h4 | 2.0927 | 11.500 | 96.264 | 24.06605 | 0.046 λ0 |
| 4th LAYER | al2o3 | 1.6376 | 134.271 | 879.529 | 219.8822 | 0.423 λ0 |
| 3rd LAYER | sio2 | 1.4671 | 34.739 | 203.862 | 50.96559 | 0.098 λ0 |
| 2nd LAYER | al2o3 | 1.6376 | 38.219 | 250.350 | 62.58743 | 0.120 λ0 |
| 1st LAYER | sio2 | 1.4671 | 33.600 | 197.178 | 49.29456 | 0.095 λ0 |
| ADHESION LAYER | EPOXY RESIN | 1.5520 | — | — | — | |

FIG. 17 EXAMPLES 2-1 TO 2-6 (EIGHT-LAYER CONFIGURATION)

FIG. 19 (A)
COMPARATIVE EXAMPLE 1-1

| | CONSTITUENT MATERIAL | REFRACTIVE INDEX N | PHYSICAL THICKNESS d | OPTICAL THICKNESS 4n × d | OPTICAL THICKNESS n × d | |
|---|---|---|---|---|---|---|
| OPTICAL SUBSTRATE | S-LAH79 | 2.0033 | — | — | — | |
| 2nd LAYER | sub-m2 | 1.7801 | 67.793 | 482.713 | 120.6783 | 0.232 λ0 |
| 1st LAYER | al2o3 | 1.6376 | 83.960 | 549.972 | 137.4929 | 0.264 λ0 |
| ADHESION LAYER | EPOXY RESIN | 1.5520 | | | — | |

FIG. 20 (A)
COMPARATIVE EXAMPLE 1-2

| | CONSTITUENT MATERIAL | REFRACTIVE INDEX N | PHYSICAL THICKNESS d | OPTICAL THICKNESS 4n x d | OPTICAL THICKNESS n x d |
|---|---|---|---|---|---|
| OPTICAL SUBSTRATE | S-NPH2 | 1.9229 | — | — | — |
| 2nd LAYER | sub-m2 | 1.7801 | 67.550 | 480.983 | 120.2458 / 0.231 λ0 |
| 1st LAYER | al2o3 | 1.6376 | 88.030 | 576.632 | 144.1579 / 0.277 λ0 |
| ADHESION LAYER | EPOXY RESIN | 1.5520 | — | — | — |

FIG. 21 (A)
COMPARATIVE EXAMPLE 1-3

| | CONSTITUENT MATERIAL | REFRACTIVE INDEX N | PHYSICAL THICKNESS d | OPTICAL THICKNESS 4n x d | OPTICAL THICKNESS n x d |
|---|---|---|---|---|---|
| OPTICAL SUBSTRATE | LASF-N17 | 1.8830 | — | — | — |
| 2nd LAYER | sub-m2 | 1.7801 | 72.947 | 519.412 | 129.853 |
| 1st LAYER | al2o3 | 1.6376 | 80.475 | 527.143 | 131.7859 |
| ADHESION LAYER | EPOXY RESIN | 1.5520 | — | — | — |

Optical thickness n x d units: $0.250\,\lambda_0$, $0.253\,\lambda_0$

FIG. 22 (A)

COMPARATIVE EXAMPLE 1-4

| | CONSTITUENT MATERIAL | REFRACTIVE INDEX N | PHYSICAL THICKNESS d | OPTICAL THICKNESS 4n x d | OPTICAL THICKNESS n x d |
|---|---|---|---|---|---|
| OPTICAL SUBSTRATE | S-TIH53 | 1.8467 | — | — | — |
| 2nd LAYER | sub-m2 | 1.7801 | 75.683 | 538.893 | 0.259 λ0 <br> 134.7233 |
| 1st LAYER | al2o3 | 1.6376 | 83.237 | 545.236 | 0.262 λ0 <br> 136.3089 |
| ADHESION LAYER | EPOXY RESIN | 1.5520 | — | — | — |

FIG. 23 (A)
COMPARATIVE EXAMPLE 1-5

| | CONSTITUENT MATERIAL | REFRACTIVE INDEX N | PHYSICAL THICKNESS d | OPTICAL THICKNESS 4n x d | OPTICAL THICKNESS n x d |
|---|---|---|---|---|---|
| OPTICAL SUBSTRATE | SFL6 | 1.8052 | — | — | — |
| 2nd LAYER | sub-m2 | 1.7801 | 71.612 | 509.906 | 0.245 $\lambda_0$ |
| 1st LAYER | al2o3 | 1.6376 | 84.833 | 555.690 | 0.267 $\lambda_0$ |
| ADHESION LAYER | EPOXY RESIN | 1.5520 | — | — | — |

ANTIREFLECTION FILM, OPTICAL ELEMENT AND OPTICAL SYSTEM

CROSS-REFERENCE TO RELATED APPLICATIONS

This application is based upon and claims the benefit of priority from the Japanese Patent Application No. 2007-74530 filed on Mar. 22, 2007; the entire contents of which are incorporated herein by reference.

BACKGROUND OF THE INVENTION

1. Technical Field

The invention relates to an antireflection film that is formed on a bonded surface between optical members such as a lens and a filter and exerts an antireflection effect with respect to light in a predetermined band; an optical element; and an optical system including the same.

2. Description of the Related Art

In general, an imaging apparatus such as a photographing camera and a broadcasting camera has a plurality of optical members, such as lenses, prisms, and filters, disposed on its light path. When the optical members are bonded to each other through an adhesion layer made of a transparent resin, a part of incident light may be reflected at the adhesion interface between the adhesion layer and the optical members, thereby causing flare or ghost appearing on an image. Further, reflectivity at the adhesion interface has distribution depending on the wavelength of the incident light, and also shows different wavelength dependency in accordance with constituent materials of the respective optical members. Therefore, chromaticity balance is degraded, and it is necessary to adjust the white balance of the entire imaging apparatus.

Accordingly, an antireflection film is provided between the optical members and the adhesion layer.

The antireflection film is a multilayer film in which a plurality of dielectric films having different refractive indices from each other are combined. JP 2001-74903 A and JP 2006-284656 A disclose antireflection films.

Recently, however, an optical system in which a glass having a high refractive index Nd of around 2.0 with respect to d line (wavelength λ=587.56 nm) is frequently used. In the antireflection films disclosed in JP 2001-74903 A and JP 2006-284656 A, there are difficulties in sufficiently reducing reflectivity at the upper and lower limits of a band that is thought to be a visible-light region (that is, around 400 nm and around 700 nm). Therefore, such a method has been considered that reduction in reflectivity is achieved by an adhesion layer made of a resin material having a higher refractive index. Actually, however, there exists no proper resin having a refractive index Nd of more than 1.6. Therefore, even when a glass having a refractive index of around 2.0 is bonded, an antireflection film which that exert excellent light transmittance is demanded.

SUMMARY OF THE INVENTION

The invention has been made in view of the above circumstances, and provides an antireflection film that has lower reflectivity in a sufficiently wide band even if optical members having higher refractive indices are bonded and provides an optical element and an optical system including the antireflection film.

According to an aspect of the invention, an antireflection film is provided between an optical member and an adhesion layer and includes a multilayer film having at least first to sixth layers that are laminated in order from the adhesion-layer side. An equivalent refractive index of the multilayer film as a whole is lower than that of the optical member and higher than that of the adhesion layer. Also, refractive indices of the second, fourth and sixth layers are higher than those of the first and third layers and lower than that of the fifth layer. Furthermore, according to another aspect of the invention, in an optical element, an optical member having a refractive index of 1.75 to 2.10 at d line and another optical member are bonded to each other through an adhesion layer. The above antireflection film is provided between the optical member and the adhesion layer. According to further another aspect of the invention, an optical system includes the above optical element.

In the antireflection film, the optical element and the optical system, the multilayer film having the at least first to sixth layers in order from the one side of the adhesion layer has an intermediate refractive index between that of the optical member and that of the adhesion layer. Refractive indices of the second, fourth and sixth layers are higher than those of the first and third layers and lower than that of the fifth layer. Therefore, even if a refractive index Nd of the substrate exceeds 2.0, a reflectivity distribution can be sufficiently reduced in a wider band.

Also, in the antireflection film, the optical element an d optical system, the following conditional expressions (1) to (6) may be satisfied:

$$0.06 \times \lambda 0 \leq N1 \cdot d1 \leq 0.11 \times \lambda 0 \quad (1)$$

$$0.07 \times \lambda 0 \leq N2 \cdot d2 \leq 0.13 \times \lambda 0 \quad (2)$$

$$0.06 \times \lambda 0 \leq N3 \cdot d3 \leq 0.18 \times \lambda 0 \quad (3)$$

$$0.31 \times \lambda 0 \leq N4 \cdot d4 \leq 0.43 \times \lambda 0 \quad (4)$$

$$0.04 \times \lambda 0 \leq N5 \cdot d5 \leq 0.09 \times \lambda 0 \quad (5)$$

$$0.06 \times \lambda 0 \leq N6 \cdot d6 \leq 0.18 \times \lambda 0 \quad (6)$$

where λ0 denotes a center wavelength, N1 to N6 denote refractive indices of the first to sixth layers at the center wavelength λ0, and d1 to d6 denote physical thicknesses of the first to sixth layers.

In the antireflection film, the optical element and optical system, the multilayer film may further include seventh and eighth layers that are laminated on an optical-member side of the sixth layer. A refractive index of the seventh layer is higher than those of the first to fourth and sixth layers. A refractive index of the eighth layer is higher than those of the first and third layers and is lower than those of the fifth and seventh layers. In this case, the following conditional expressions (7) and (8) may be satisfied:

$$0.05 \times \lambda 0 \leq N7 \cdot d7 \leq 0.14 \times \lambda 0 \quad (7)$$

$$0.04 \times \lambda 0 \leq N8 \cdot d8 \leq 0.07 \times \lambda 0 \quad (8)$$

where λ0 denotes the center wavelength, N7 and N8 denote refractive indices of the seventh and eighth layers at the center wavelength λ0, and d7 and d8 denote physical thicknesses of the seventh and eighth layers.

In the antireflection film, the optical element and optical system, the first and third layers may be made of a low refractive index material having refractive index of 1.35 to 1.50 at d line. The second, fourth, sixth, and eighth layers may be made of a middle refractive index material having a refractive index of 1.55 to 1.85 at the d line. The fifth and seventh layers may be made of a high refractive index material having a refractive index, at the d line, that is in a range of 1.70 to 2.50 and that is higher than that of the middle refractive index material.

In the antireflection film, the optical element and the optical system, the low refractive index material may include at least one of $MgF_2$, $SiO_2$ and $AlF_3$. The middle refractive index material may include at least one of $PrAlO_3$, $La_{2X}Al_{2Y}O_{3(X+Y)}$, $Al_2O_3$, $GeO_2$ and $Y_2O_3$. The high refractive index material may include at least one of $LaTi_2$, $ZrO_2$, $TiO_2$, $Ta_2O_5$, $Nb_2O_5$, $HfO_2$, and $CeC_2$.

In the antireflection film, the optical element and the optical system, the other optical member may have a refractive index of 1.75 to 2.10 at the d line. Another antireflection film may be provided between the other optical member and the adhesion layer. The other antireflection film may include a multilayer film having at least ninth to fourteenth layers that are disposed between the other optical member and the adhesion layer. The ninth to fourteenth layers are laminated in order from the other side of the adhesion layer. An equivalent refractive index of the entire multilayer film of the other antireflection film may be lower than that of the other optical member and higher than that of the adhesion layer. Refractive indices of the tenth, twelfth and fourteenth layers may be higher than those of the ninth and eleventh layers and lower than that of the thirteenth layer.

With the above antireflection film, the antireflection film has the intermediate refractive index between that of the optical member and that of the adhesion layer and includes the multilayer film having the first to sixth layers. In the multilayer film, the refractive indices of the second, fourth, and sixth layers are set to be higher than those of the first and third layers and lower than that of the fifth layer. Therefore, even if the refractive index of the optical member is around 2.0, low reflectivity can be exhibited in a sufficiently wide band. Accordingly, when an optical element (such as cemented lens or the like) using the antireflection film is applied to an optical system mounted on photographing cameras or broadcasting cameras, it is possible to suppress the occurrence of flare or ghost and to obtain more excellent chromaticity balance.

DETAILED DESCRIPTION OF EMBODIMENTS OF THE INVENTION

Hereinafter, embodiments of the invention will be described in detail with reference to the accompanying drawings.

First Embodiment

Figure 1:
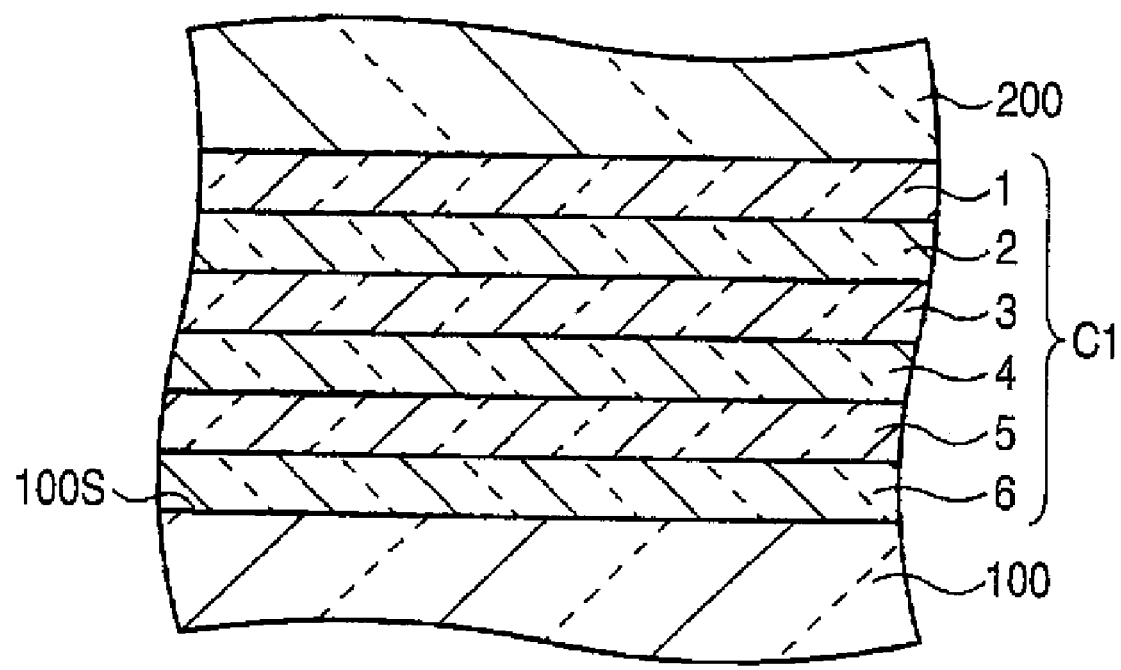
FIG. 1 is a schematic cross-section view of an antireflection film according to a first embodiment of the invention.

FIG. 1 is a schematic cross-section view of an antireflection film C1 according to a first embodiment of the invention. The antireflection film C1 of FIG. 1 corresponds to first numerical examples (FIGS. 4 to 10) which will be described later.

The antireflection film C1 is provided between an optical substrate 100 and an adhesion layer 200 and includes a multilayer film having first to sixth layers 1 to 6 which are laminated in order from one side of the adhesion layer 200. An equivalent refractive index of the entire antireflection film C1 is set to be lower than a refractive index of the optical substrate 100 and higher than that of the adhesive layer 200. In FIG. 1, a top surface 100S of the optical substrate 100 having the antireflection film C1 provided thereon is made of a planar surface. However, the invention is not limited thereto. The top surface 100S may be made of a curved surface. That is, a lens having a spherical surface or an aspherical surface may be used as the optical substrate 100, and the antireflection film C1 may be provided on the spherical surface or aspherical surface of the lens.

The optical substrate 100 is made of a transparent material such as glass or a crystalline material. Specifically, it is preferable that the optical substrate 100 is made of SF-14, SF6 (made by Schott AG, Germany), LASF-N17, S—NPH2, S-TIH53, or S-LAH79 (made by OHARA Inc.), which has a refractive index less of 1.75 to 2.10 at d line (wavelength $\lambda$=587.56 nm).

The adhesion layer 200 is made of an epoxy resin-based adhesive, for example, and has a refractive index of 1.45 to 1.60 at the d line.

The first and third layers 1 and 3 are low refractive index layers made of a low refractive index material having a refractive index of 1.35 to 1.50 at the d line. Also, the second, fourth, and sixth layers 2, 4, and 6 are middle refractive index layers made of a middle refractive index material having a refractive index of 1.55 to 1.85 at the d line. Furthermore, the fifth layer 5 is a high refractive index layer made of a high refractive index material having a refractive index, at the d line, that is a range of 1.70 to 2.50 and that is higher than that of the middle refractive index material.

As the low refractive index material, magnesium fluoride ($MgF_2$), silicon dioxide ($SiO_2$), aluminum fluoride ($AlF_3$), a mixture of them and a compound of them may be used. As the middle refractive index material, praseodymium aluminate ($PrAlO_3$), lanthanum aluminate ($La_{2X}Al_{2Y}O_{3(X+Y)}$), aluminum oxide ($Al_2O_3$), germanium oxide ($GeO_2$), yttrium oxide ($Y_2O_3$), a mixture of them and a compound of them may be used. As the high refractive index material, lanthanum titanate ($LaTiO_3$), zirconium oxide ($ZrO_2$), titanium oxide ($TiO_2$), tantalum oxide ($Ta_2O_5$), niobium oxide ($Nb_2O_5$), hafnium oxide ($HfO_2$), cerium oxide ($CeO_2$), a mixture of them and a compound of them may be used.

Preferably, the first to sixth layers 1 to 6 are formed to satisfy the following conditional expressions (1) to (6). Here, $\lambda 0$ denotes a center wavelength (unit: nm), N1 to N6 denotes refractive indices of the first to sixth layers 1 to 6 at the center wavelength, and d1 to d6 denote physical thicknesses (unit: nm) of the first to sixth layers 1 to 6.

$$0.06 \times \lambda 0 \leq N1 \cdot d1 \leq 0.11 \times \lambda 0 \quad (1)$$

$$0.07 \times \lambda 0 \leq N2 \cdot d2 \leq 0.13 \times \lambda 0 \quad (2)$$

$$0.06 \times \lambda 0 \leq N3 \cdot d3 \leq 0.18 \times \lambda 0 \quad (3)$$

$$0.31 \times \lambda 0 \leq N4 \cdot d4 \leq 0.43 \times \lambda 0 \quad (4)$$

$$0.04 \times \lambda 0 \leq N5 \cdot d5 \leq 0.09 \times \lambda 0 \quad (5)$$

$$0.06 \times \lambda 0 \leq N6 \cdot d6 \leq 0.18 \times \lambda 0 \quad (6)$$

With the antireflection film C1 according to this embodiment, the multilayer film including the first to sixth layers 1 to 6, which are laminated in order from the one side of the adhesion layer 200, has an intermediate refractive index between those of the optical substrate 100 and the adhesion layer 200, as a whole. The refractive indices of the second, fourth, and sixth layers 2, 4, and 6 are higher than those of the first and third layers 1 and 3 and lower than that of the fifth layer 5. Therefore, even if the refractive index Nd of the optical substrate 100 is around 2.0, reflectivity is sufficiently reduced in a wider band. Further, an optical thickness N·d is optimized by making the first to sixth layers 1 to 6 satisfy the respective conditional expressions (1) to (6). Therefore, the above-described effect can be further increased. Specifically, when the antireflection film C1 is provided between the optical substrate 100 having the refractive index of 2.00 at the d line and the adhesion layer 200 having the refractive index of 1.50 to 1.60 at the d line, a reflectivity for normal incident light in at least a band of 400 to 700 nm can be reduced to less than 0.02%. Therefore, when the antireflection film C1 is applied to an optical system used in photographing cameras or broadcasting cameras, the occurrence of flare or ghost can be suppressed by reducing the reflection of incident light, and more excellent color chromaticity balance can be obtained.

In general, the reflectivity distribution of an antireflection film tends to be shifted in a short-wavelength side, as an incident angle increases. Therefore, according to the antireflection film C1 of this embodiment, the reflectivity can be reduced in a wider band than in the conventional antireflection film. Accordingly, the antireflection film can cope with incident light having a larger incident angle.

Further, when the multilayer film is formed on a curved surface such as a lens surface, the thickness of the multilayer film tends to easily decrease in a region where the curvature of the curved surface is relatively large, compared with the other regions where the curvature is relatively small. According to the antireflection film C1 of this embodiment, however, sufficiently-low reflectivity is achieved in the wider band than in the conventional antireflection film. Therefore, even if a slight variation in the thickness occurs as described above, its excellent optical characteristic can be maintained.

Second Embodiment

Figure 2:
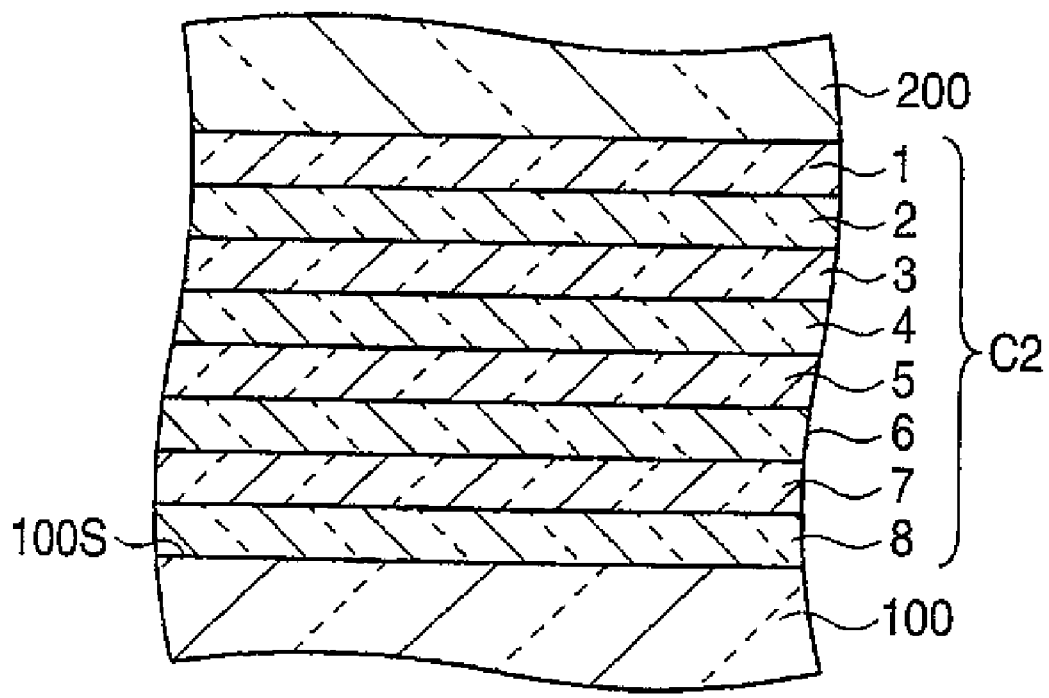
FIG. 2 is a schematic cross-section view of an antireflection film according to a second embodiment of the invention.

FIG. 2 is a schematic cross-section view of an antireflection film C2 according to a second embodiment of the invention. The antireflection film C2 of FIG. 2 corresponds to second numerical examples (shown in FIGS. 10 to 16) which will be described later.

The antireflection film C2 has the same configuration as that of the antireflection film C1 according to the first embodiment, except that the antireflection film C2 includes a multilayer film having eight layers in total. That is, the antireflection film C2 further includes seventh and eight layers 7 and B which are additionally laminated on the optical-substrate side of the sixth layer 6 in the reflection preventing layer C1. Therefore, the following descriptions will be mainly focused on the seventh and eight layers 7 and 8, and the descriptions of the other components will be omitted appropriately.

The eighth layer 8 is a middle refractive index layer made of a middle refractive index material having a refractive index of 1.55 to 1.85 at the d line, like the second, fourth, and sixth layers. On the contrary, the seventh layer 7 is a high refractive index layer having a refractive index at the d line that is in a range of 1.70 to 2.50 and that is higher than that of the middle refractive index layer, like the fifth layer.

Preferably, the seventh and eighth layers 7 and 8 are formed to satisfy the following conditional expressions (7) and (8).

$$0.05 \times \lambda 0 \leq N7 \cdot d7 \leq 0.14 \times \lambda 0 \quad (7)$$

$$0.04 \times \lambda 0 \leq N8 \cdot d8 \leq 0.07 \times \lambda 0 \quad (8)$$

According to the antireflection film C2 of this embodiment, the multilayer film including the first to eighth layers 1 to 8, which are laminated in order from the one side of the adhesion layer 200, has an intermediate refractive index between those of the optical substrate 100 and the adhesion layer 200, as a whole. Further, the refractive indices of the second, fourth, sixth, and eighth layers 2, 4, 6, and 8 are higher than those of the first and third layers 1 and 3 and lower than those of the fifth and seventh layers 5 and 7. Therefore, even if the refractive index Nd of the optical substrate 100 is around 2.0, reflectivity is further sufficiently reduced in a wider band than in the antireflection film C1 according to the first embodiment. Furthermore, an optical thickness N·d is optimized by making the first to eighth layers 1 to 8 satisfy the respective conditional expressions (1) to (8). Therefore, the above-described effect can be further increased. Specifically, when the antireflection film C2 is provided between the optical substrate 100 having a refractive index Nd of 2.0 at the d line and the adhesion layer 200 having a refractive index of 1.50 to 1.60 at the d line, reflectivity of normal incidence light in at least a band of 400 to 950 nm can be reduced to less than 0.02%.

Third Embodiment

Figure 3:
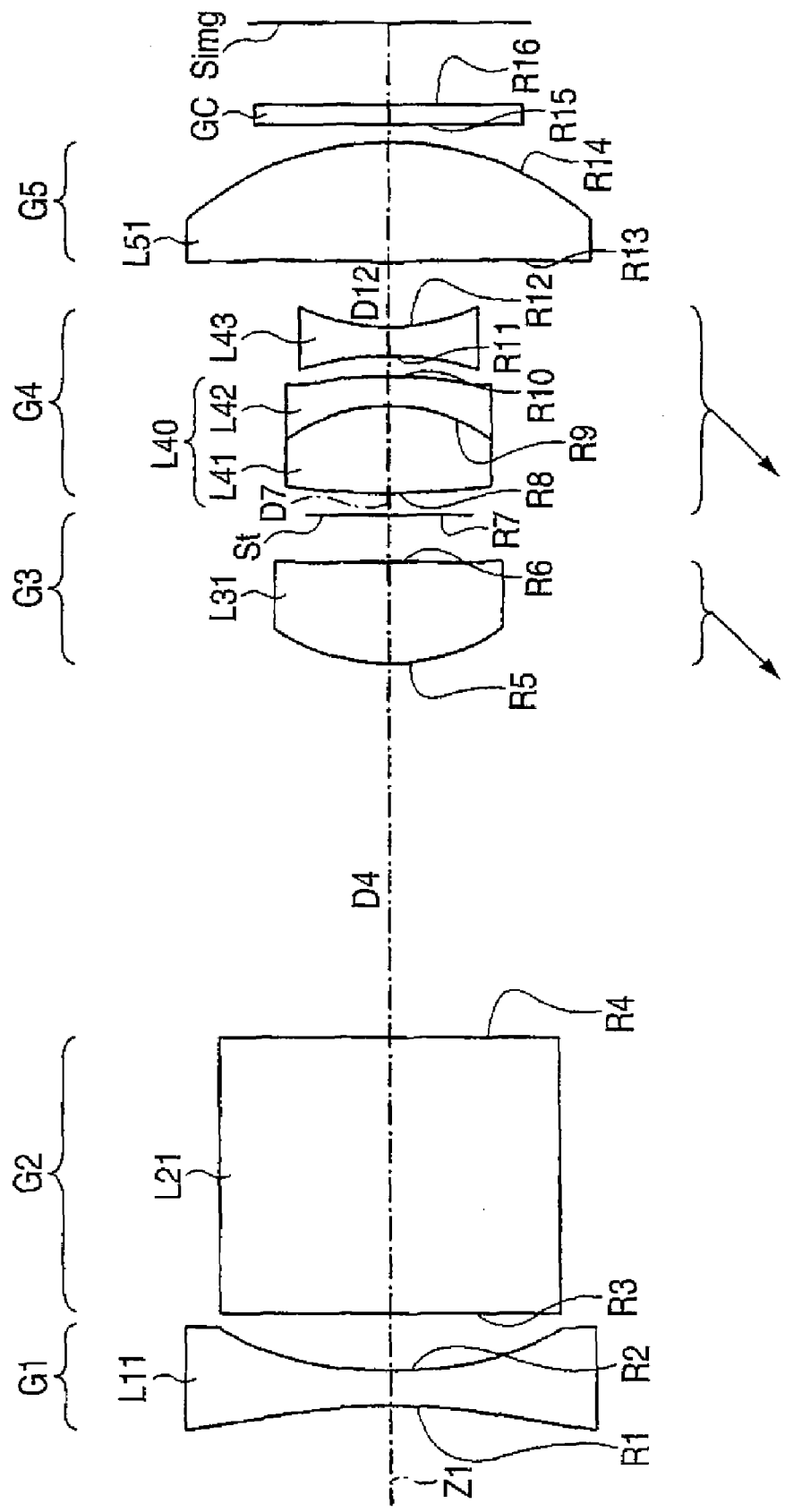
FIG. 3 is a cross-section view of a zoom lens according to a third embodiment of the invention.
Figure 4:
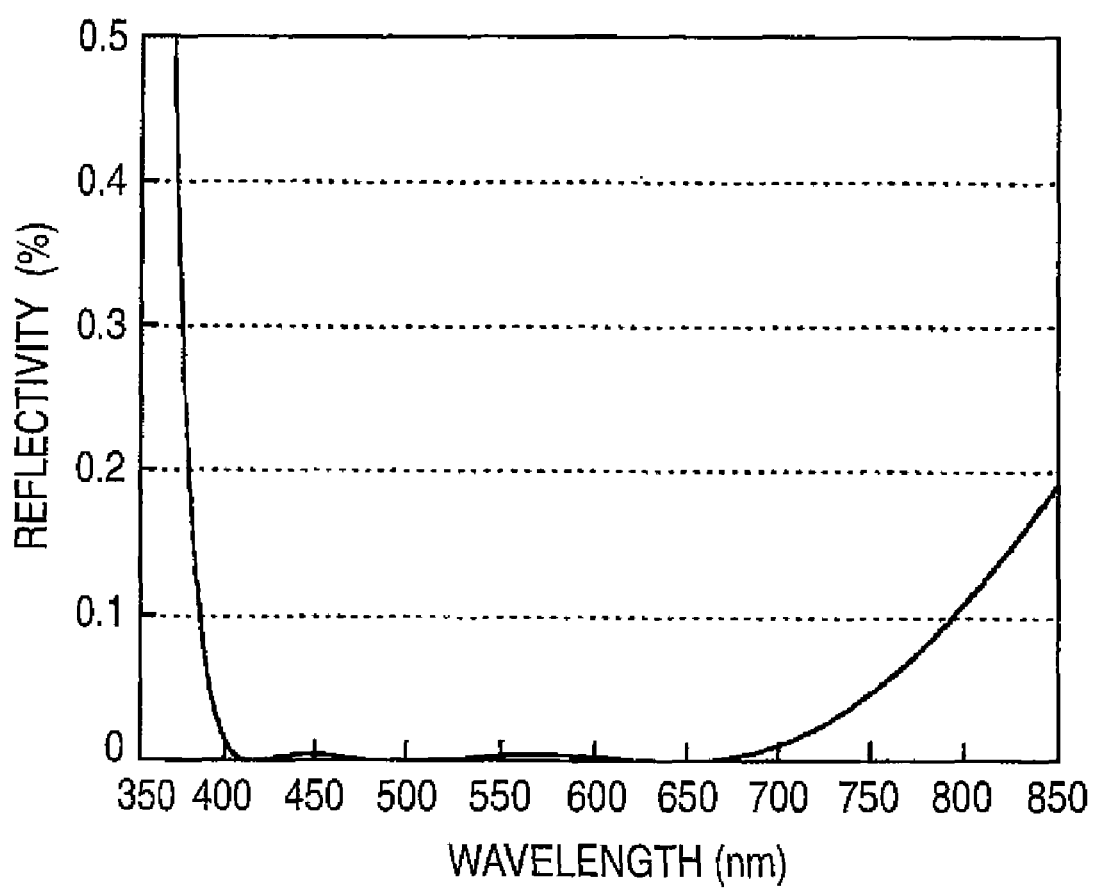
FIGS. 4A and 4B show basic data and reflectivity distribution of Example 1-1 corresponding to the antireflection film shown in FIG. 1.
Figure 5:
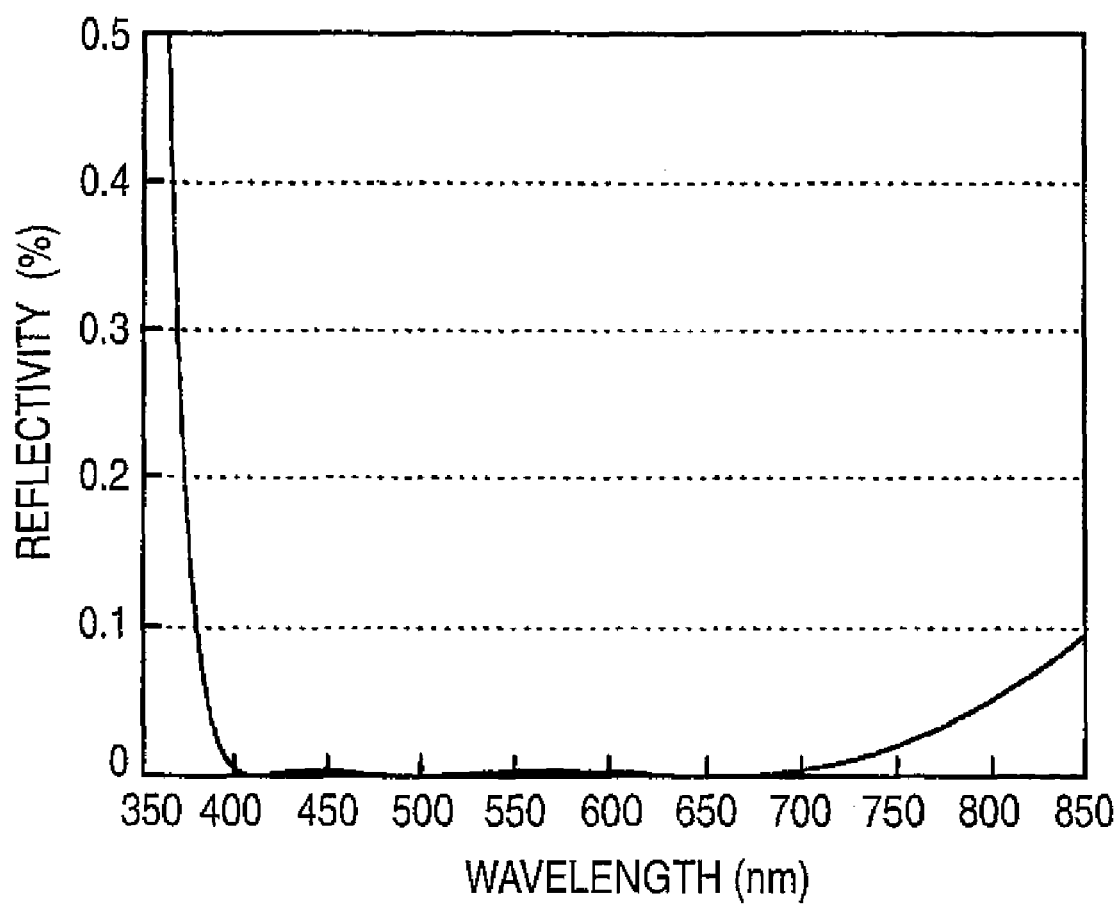
FIGS. 5A and 5B show basic data and reflectivity distribution of Example 1-2 corresponding to the antireflection film shown in FIG. 1.
Figure 6:
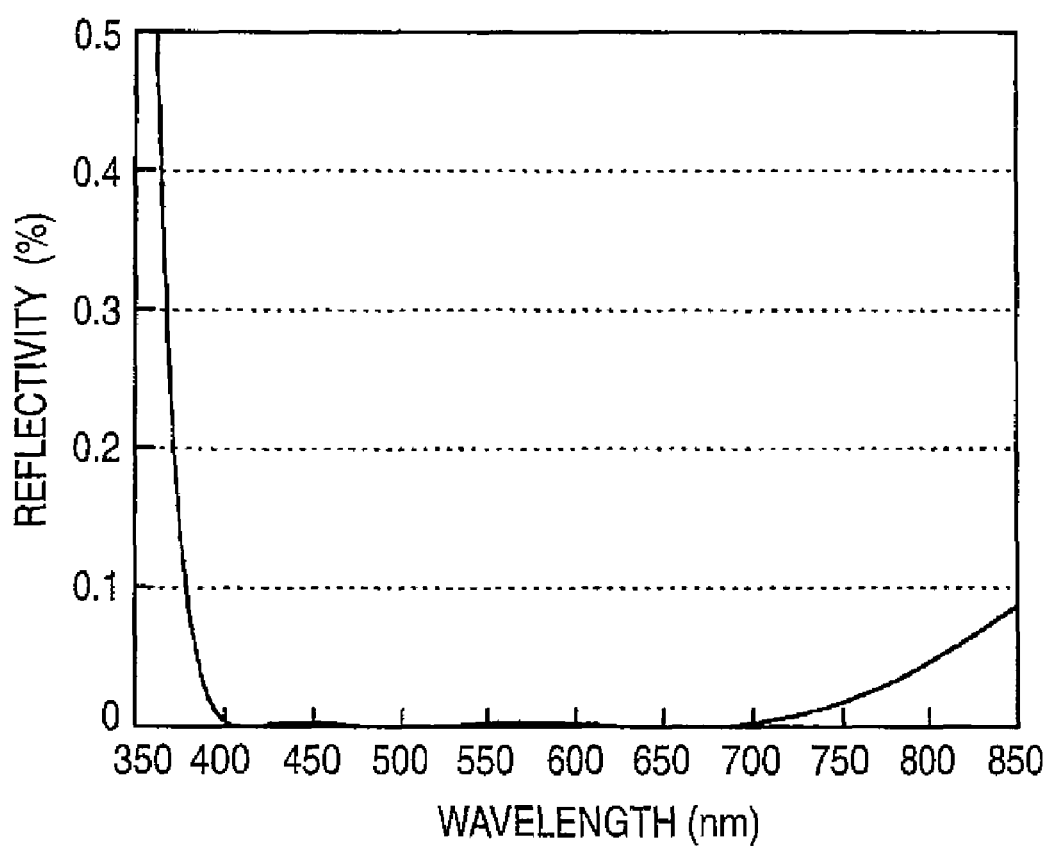
FIGS. 6A and 6B show basic data and reflectivity distribution of Example 1-3 corresponding to the antireflection film shown in FIG. 1.
Figure 7:
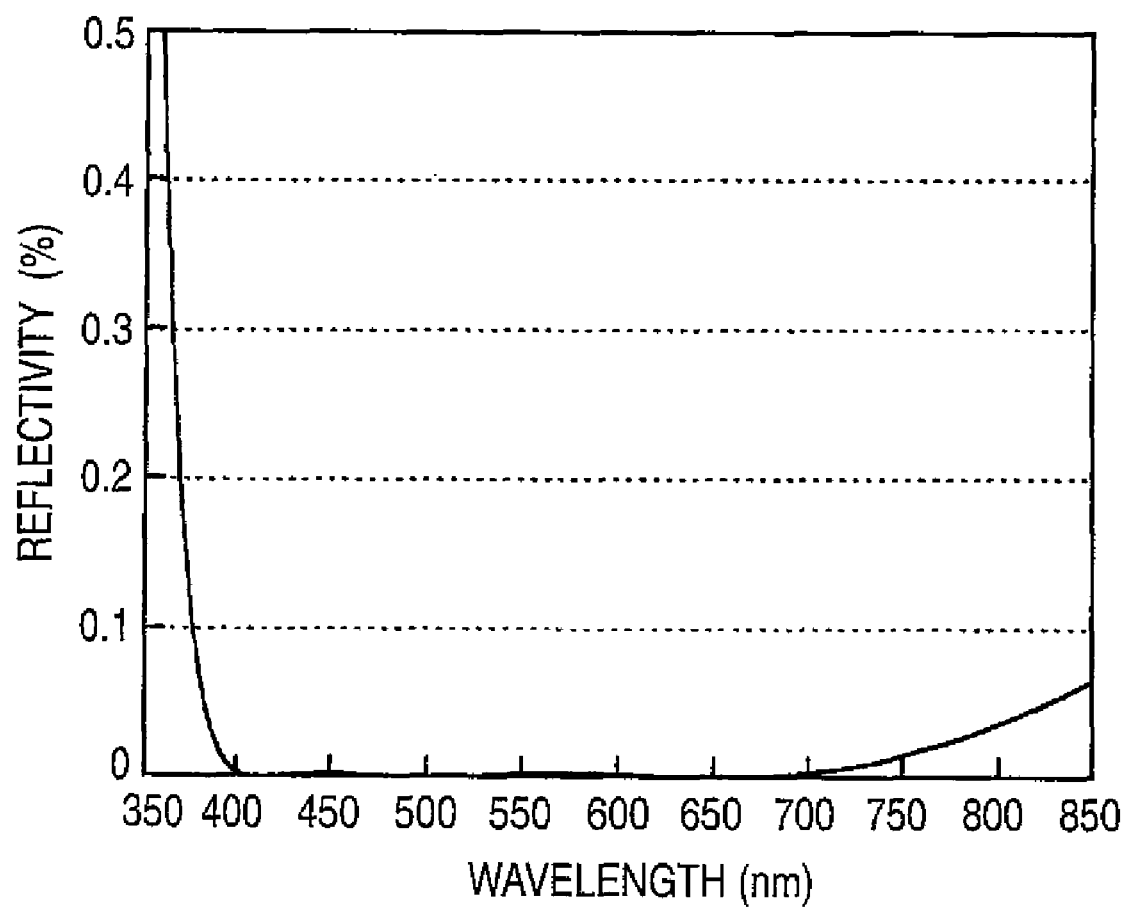
FIGS. 7A and 7B show basic data and reflectivity distribution of Example 1-4 corresponding to the antireflection film shown in FIG. 1.
Figure 8:
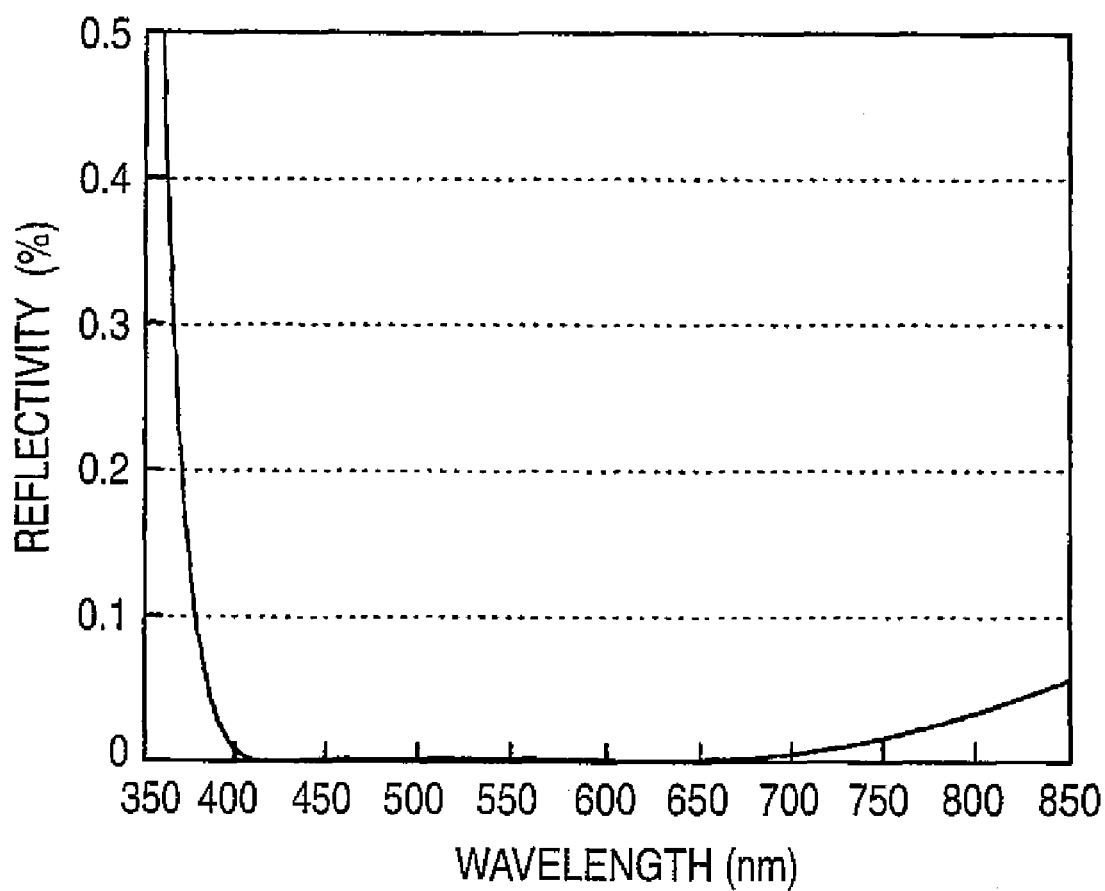
FIGS. 8A and 8B show basic data and reflectivity distribution of Example 1-5 corresponding to the antireflection film shown in FIG. 1.
Figure 9:
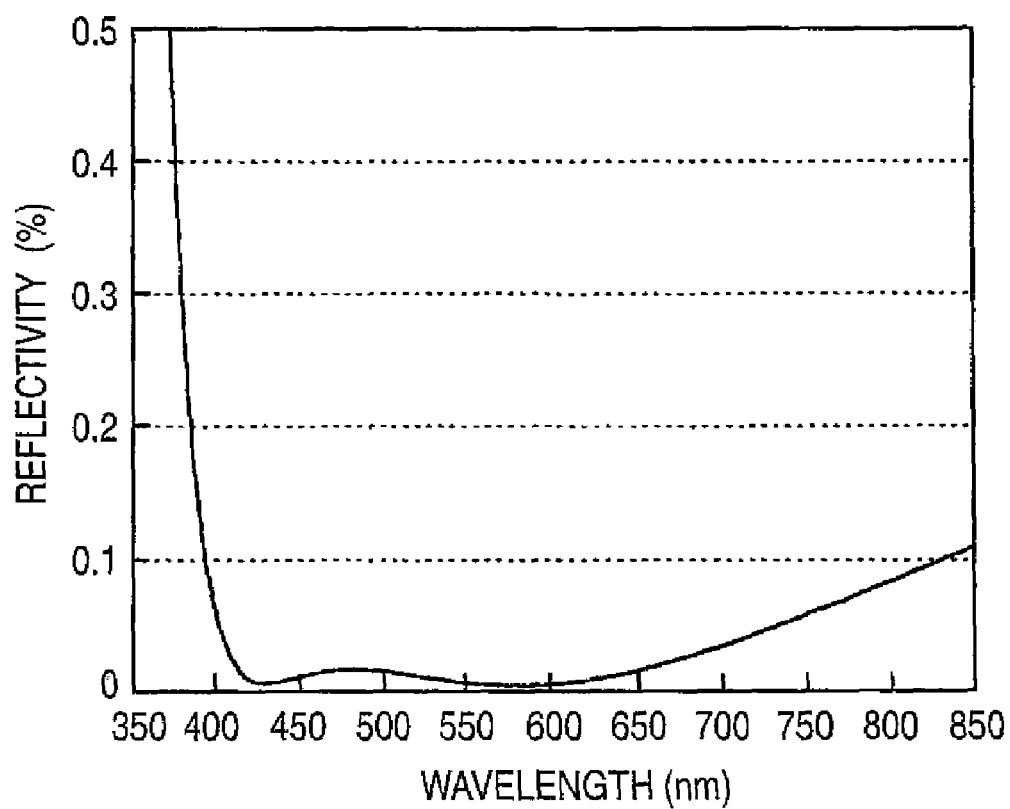
FIGS. 9A and 9B show basic data and reflectivity distribution of Example 1-2 corresponding to the antireflection film shown in FIG. 1.

FIG. 3 is a diagram showing the configuration of a zoom lens according to a third embodiment of the invention. The zoom lens includes the antireflection film C1 according to the first embodiment or the antireflection film C2 according to the second embodiment.

In FIG. 3, a surface of a constituent element on the most object side being set as a first surface, and reference numerals are assigned to the respective constituent elements with sequentially increasing toward the image side (image formation side). A reference numeral Ri represents a curvature radius of an i-th surface. Reference numeral Di represents a surface separation between the i-th surface and the (i+1)th surface, on an optical axis Z1. Reference numeral Di is assigned only to surface separations which are changed in accordance with variation of power. Further, FIG. 3 shows lens arrangement at a wide-angle end.

This zoom lens is mounted on an imaging apparatus such as a digital still camera, and first to fifth lens groups G1 to G5 are arranged in order from the object side along the optical axis Z1. The first and fourth lens groups G1 and G4 have a negative refractive power, and the third and fifth lens groups G3 and G5 have a positive refractive power. The second lens group G2 includes a prism L21 for bending a light path and does not have a refractive power. Further, the third lens group G3 has an aperture stop St.

On an image formation surface (imaging surface) Simg of the zoom lens, an imaging element (not shown) is disposed. Between the fifth lens group G5 and the imaging surface Simg, various optical components GC are disposed in accordance with the configuration of the camera having the lens mounted thereon. As the optical components GC, plane-shaped members such as a cover glass for protecting the imaging surface and various optical filters are disposed.

In this zoom lens, the first, second, and fifth lens groups G1, G2, and G5 are always fixed during a zoom operation, while the third and fourth lens groups G3 and G4 are separately moved on the optical axis Z1 during the zoom operation. As power is varied from the wide-angle end to the telephoto end, the third and fourth lens groups G3 and G4 are moved on the optical axis Z1 toward the object side, as indicated by arrows of FIG. 3.

The fourth lens group G4 has a cemented lens L40 composed of two lenses L41 and L42 and a negative lens L43. The lenses L41 and L42 are made of a glass material having a refractive index of 1.75 to 2.10. Although not shown in FIG. 3, the antireflection film C1 shown in FIG. 1 (or the antireflection film C2 shown in FIG. 2) and the adhesion layer 200 are provided on an adhesion interface between the lenses L41 and L42. Specifically, the antireflection films C1 (or the antireflection film C2) are provided on the image-side surface of the lens L41 and the object-side surface of the lens L42, respectively, and are bonded by the adhesion layer 200.

Since the antireflection film C1 (or the antireflection film C2) is provided on the adhesion interface of the cemented lens L40, lower reflectivity can be obtained than in the conventional zoom lens even if the refractive indices Nd of the lenses L41 and L42 are around 2.0. Therefore, in the zoom lens of this embodiment including the cemented lens L40, the reflection of incident light is reduced, which makes it possible to suppress the occurrence of flare or ghost. Further, more excellent chromaticity balance can be obtained.

Furthermore, since the antireflection film C1 (or the antireflection film C2) is provided in the zoom lens, ghost in an infrared region can be suppressed while transmittance in a band from a near-infrared region to a visible region can be enhanced.

The antireflection film C1 (or the antireflection film C2) may be provided only on the image-side surface of the lens L41 or the object-side surface of the lens L42. When the antireflection film is provided on both the surfaces, it is easy to obtain the above-described effect.

EXAMPLES

Next, specific numerical examples of the antireflection film according to the embodiments of the invention will be described. Further, the reflectivities in these examples indicate values when light is vertically incident.

First Numerical Examples

FIGS. 4 to 9 show first numerical examples (Examples 1-1 to 1-6). FIGS. 4(A), 5(A), 6(A), 7(A), 8(A) and 9(A) are tables showing basic data of First Numerical Examples 1-1 to 1-6 corresponding to the antireflection film C1 shown in FIG. 1. Also, FIGS. 4(B), 5(B), 6(B), 7(B), 8(B) and 9(B) show the reflectivity distribution of Examples 1-1 to 1-6.

Figure 10:
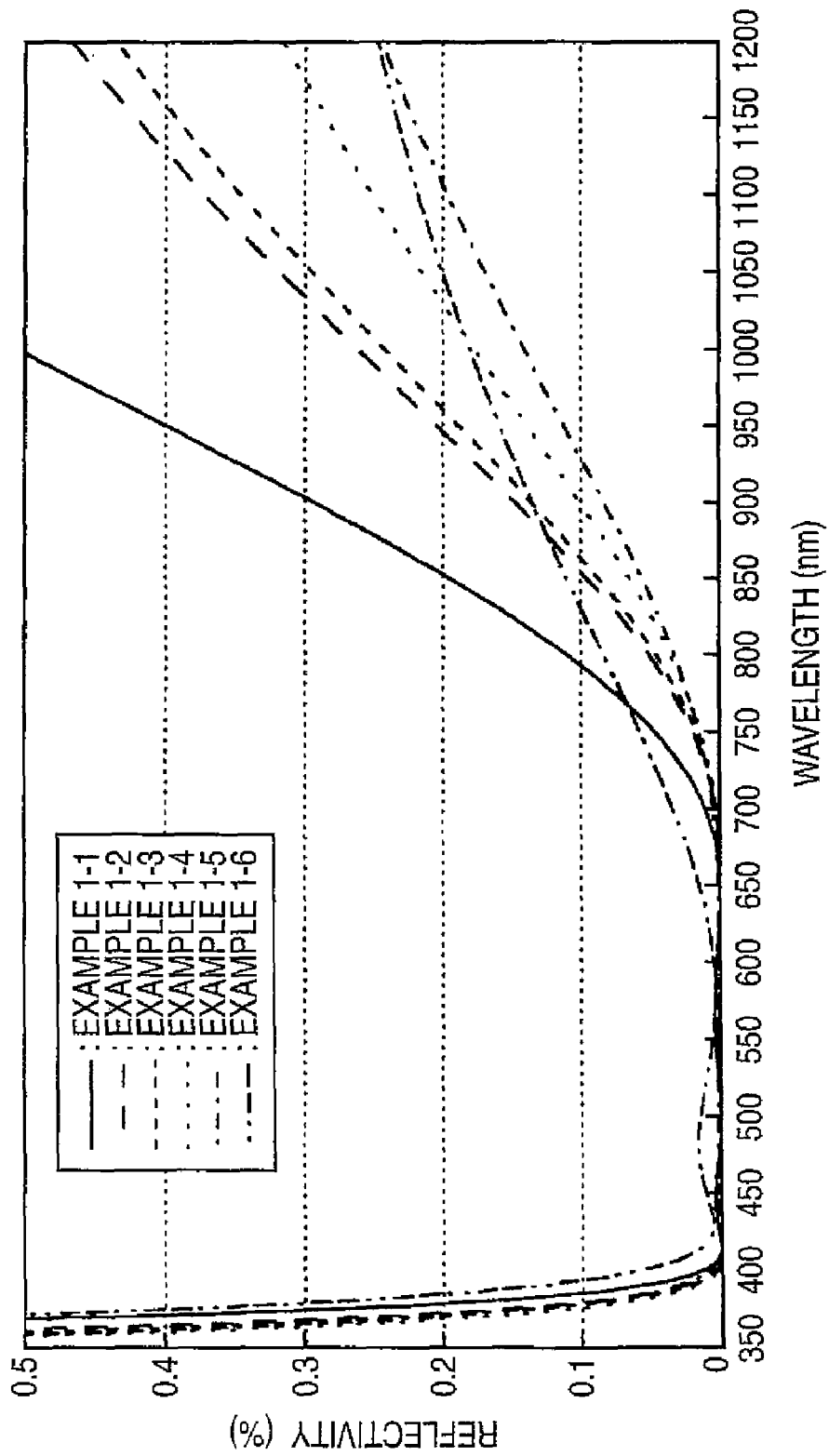
FIG. 10 is a characteristic diagram collectively showing all the reflectivity distributions of Examples 1-1 to 1-6 shown in FIGS. 5 to 9.
Figure 11:
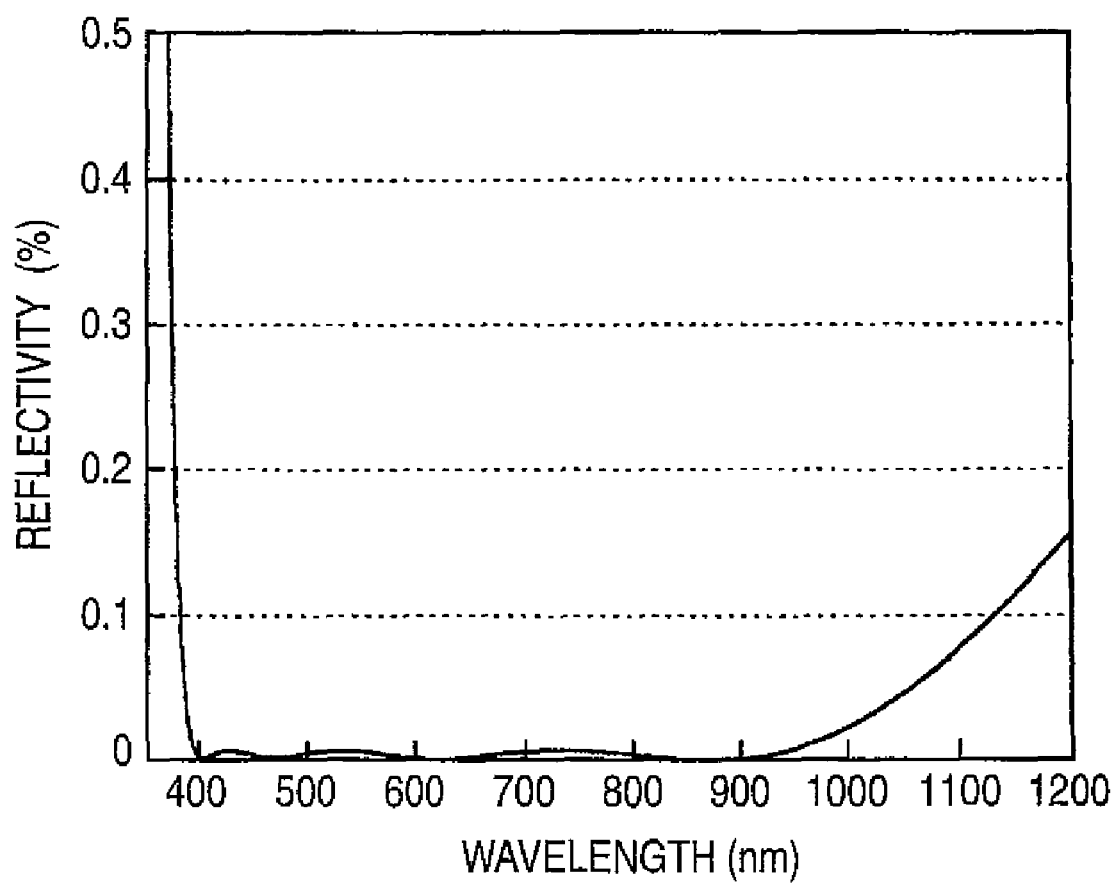
FIGS. 11A and 11B show basic data and reflectivity distribution of Example 2-1 corresponding to the antireflection film shown in FIG. 2.
Figure 12:
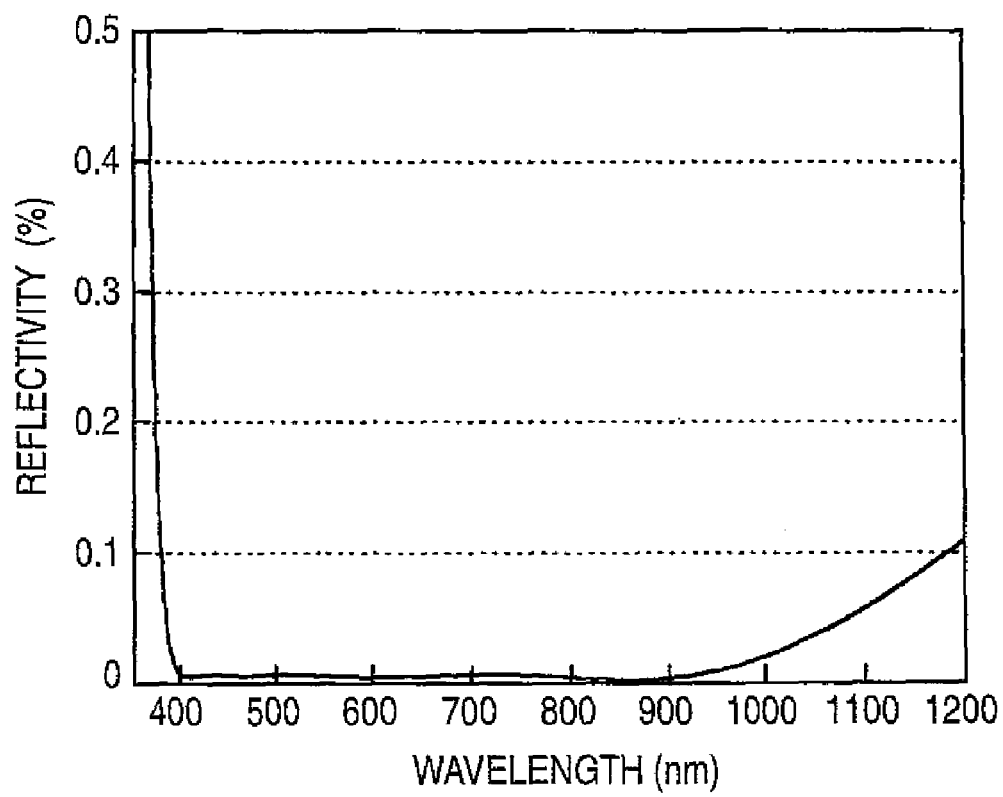
FIGS. 12A and 12B show basic data and reflectivity distribution of Example 2-2 corresponding to the antireflection film shown in FIG. 2.
Figure 13:
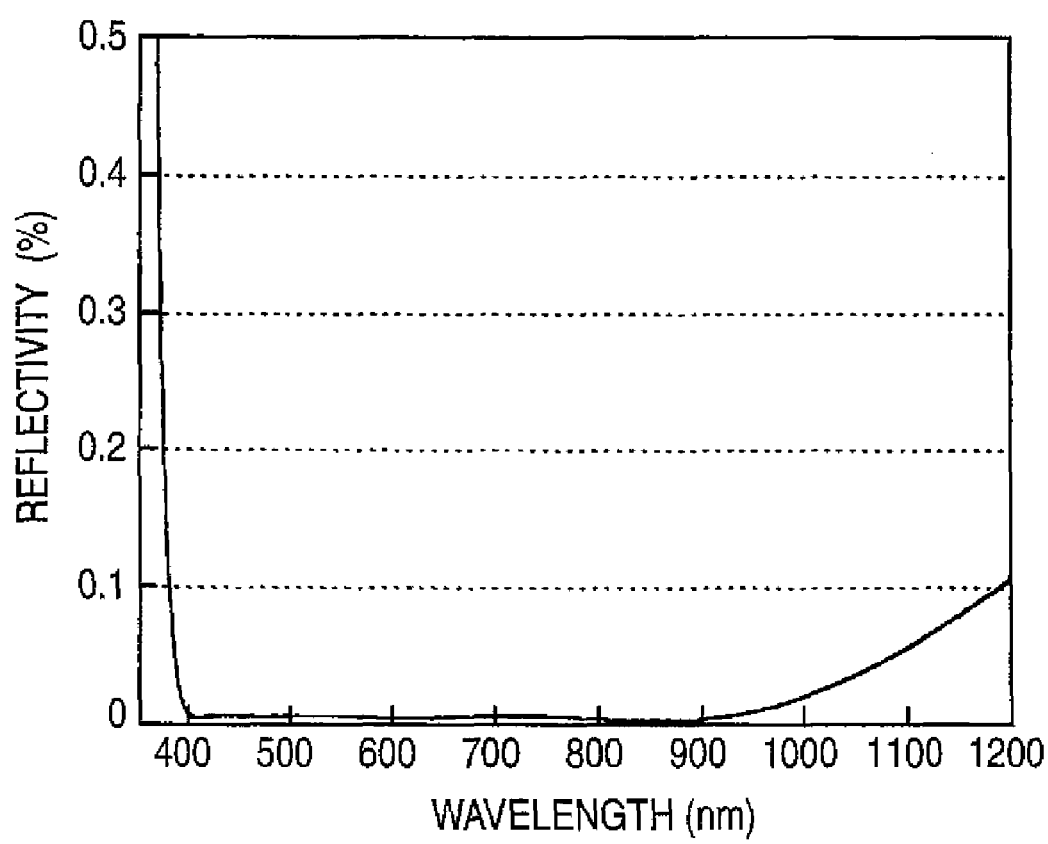
FIGS. 13A and 13B show basic data and reflectivity distribution of Example 2-3 corresponding to the antireflection film shown in FIG. 2.
Figure 14:
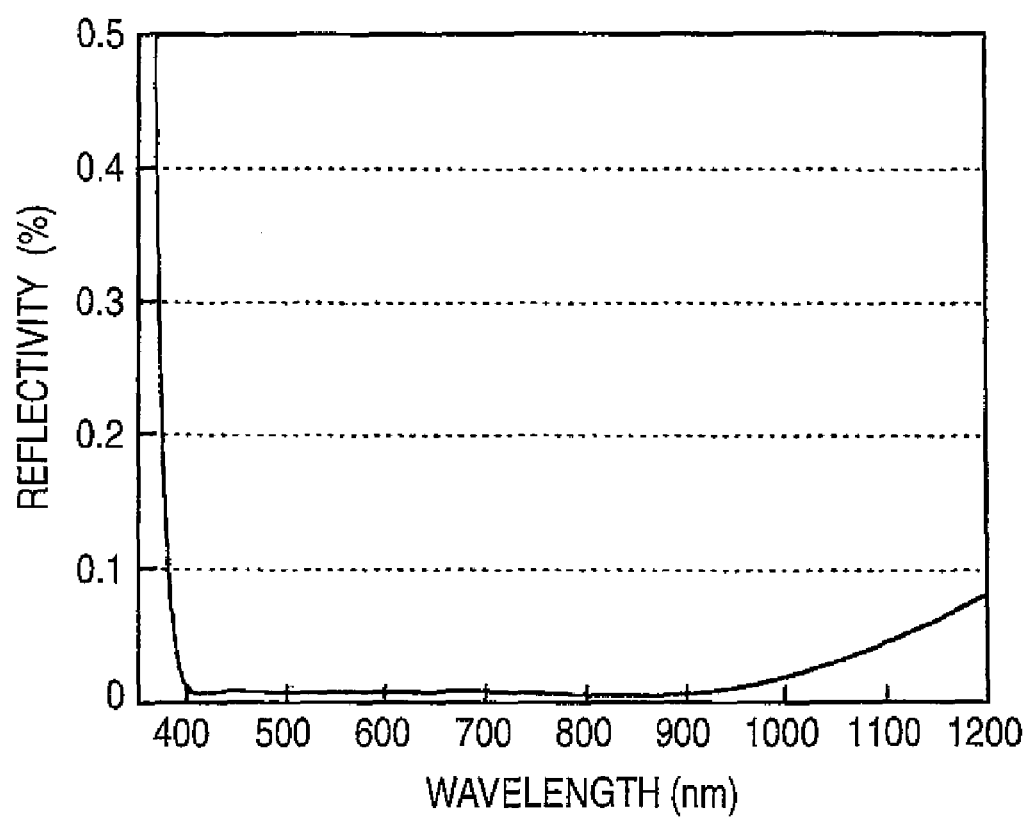
FIGS. 14A and 14B show basic data and reflectivity distribution of Example 2-4 corresponding to the antireflection film shown in FIG. 2.
Figure 15:
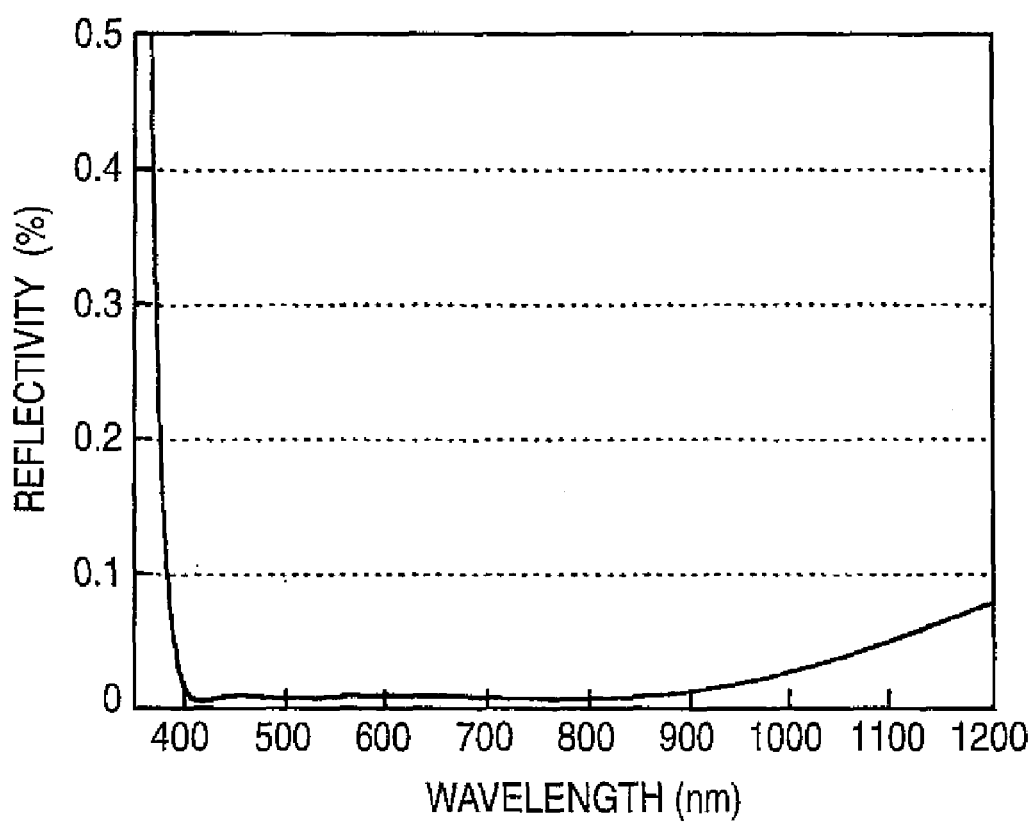
FIGS. 15A and 15B show basic data and reflectivity distribution of Example 2-5 corresponding to the antireflection film shown in FIG. 2.
Figure 16:
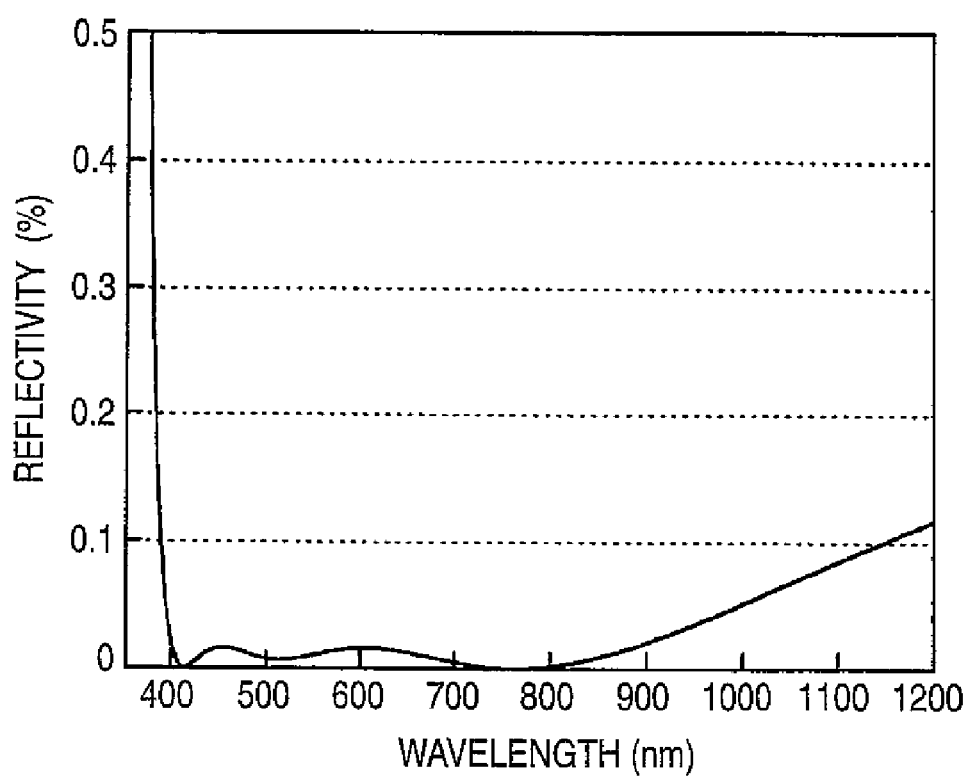
FIGS. 16A and 16B show basic data and reflectivity distribution of Example 2-6 corresponding to the antireflection film shown in FIG. 2.

FIGS. 4(A), 5(A), 6(A), 7(A), 8(A) and 9(A) show constituent materials, refractive indices N at the d line, physical thicknesses d (nm), and optical thicknesses (nm) of the respective layers. In the column of constituent material, "sub-h4" indicates a substance H4 (made by Merck & Co., Inc., Germany) which mainly consists of $LaTiO_3$. Also, a center wavelength $\lambda 0$ shown in the column of optical thickness N·d is set to 520 nm. As is clear from the respective figures, the refractive indices N and the optical thicknesses N·d of the respective layers satisfy the conditional expressions (1) to (8). Meanwhile, in FIGS. 4(B), 5(B), 6(B), 7(B), 8(B) and 9(B), the vertical axis indicates reflectivity (%), and the horizontal axis indicates a wavelength $\lambda$ (nm) at the time of measurement. FIGS. 4(B), 5(B), 6(B), 7(B), 8(B) and 9(B) show wavelength dependency of reflectivity (%) in the respective examples. FIG. 10 collectively shows the graphs of FIGS. 4(B), 5(B), 6(B), 7(B), 8(B) and 9(B). As shown in the respective figures, the reflectivity in a hand of 400 to 650 nm is less than 0.02%. Particularly, except Example 1-6, that is, if the refractive index N of the optical substrate 100 is equal to or more than 1.80, the reflectivity in a band of 400 to 700 nm is less than 0.01%.

Second Numerical Examples

FIGS. 11 to 16 show second numerical examples (Examples 2-1 to 2-6).

FIGS. 11(A), 12(A), 13(A), 14(A), 15(A) and 16(A) are tables showing basic data of Examples 2-1 to 2-6 corresponding to the antireflection film C2 shown in FIG. 2. The center wavelength λ·0 shown in the column of optical thickness N·d is set to 520 nm. As shown in the respective figures, the refractive indices N and the optical thicknesses N·d of the respective layers satisfy the conditional expressions (1) to (8).

Figure 17:
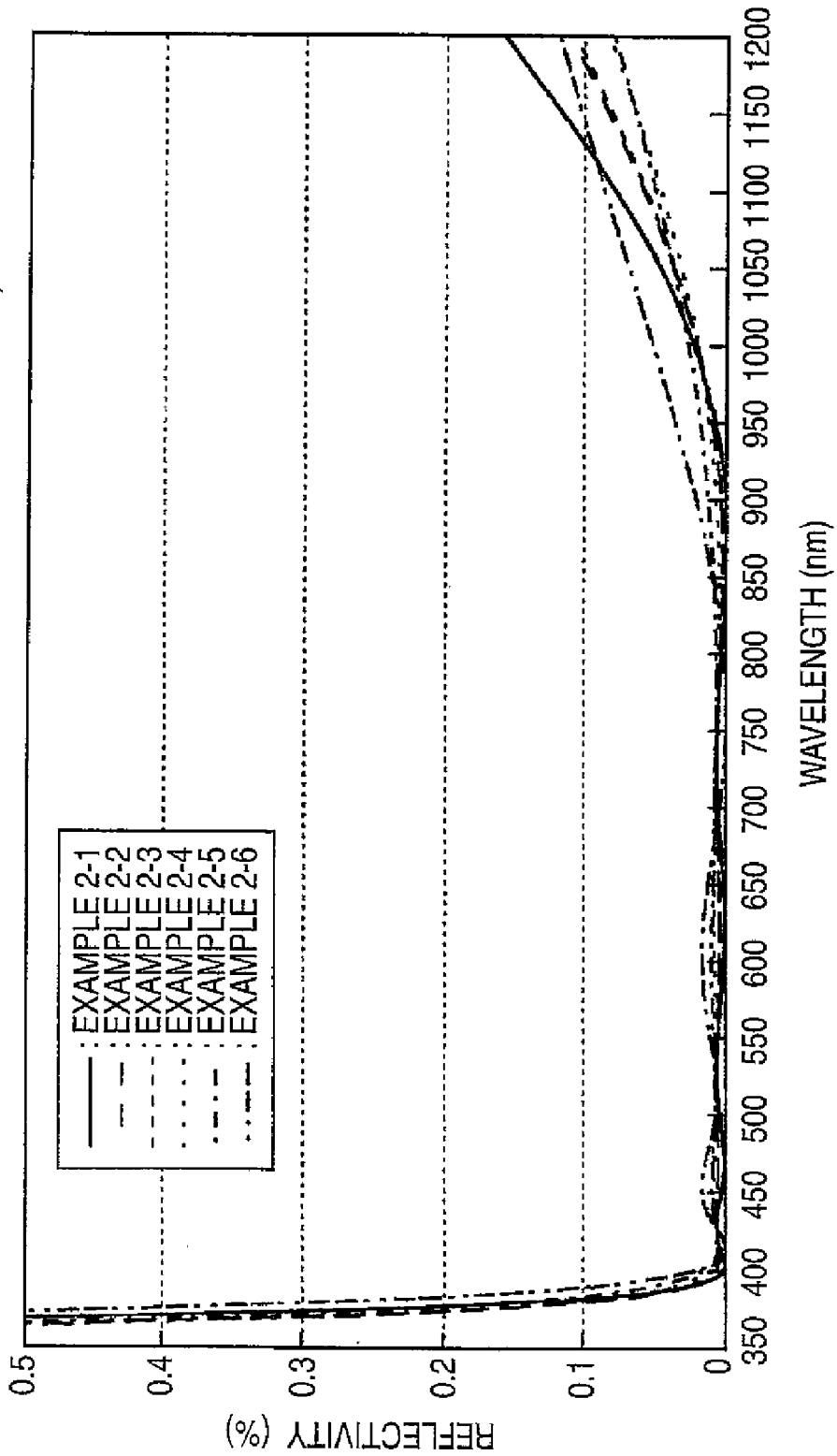
FIG. 17 is a characteristic diagram collectively showing reflectivity distribution of Examples 2-1 to 2-6 shown in FIGS. 11 to 16.

Meanwhile, FIGS. 11(B), 12(B), 13(B), 14(B), 15(B) and 16(B) show reflectivity distribution of Examples 2-1 to 2-6. FIG. 17 collectively shows the graphs of FIGS. 11(B), 12(B), 13(B), 14(B), 15(B) and 16(B). As shown in the respective figures, the reflectivity in a band of 400 to 900 nm is less than 0.02%. Particularly, except Example 2-6, that is, when the refractive index N of the optical substrate 100 is equal to or more than 1.80, the reflectivity in a band of 400 to 850 nm is less than 0.01%.

Comparative Examples

Figure 18:
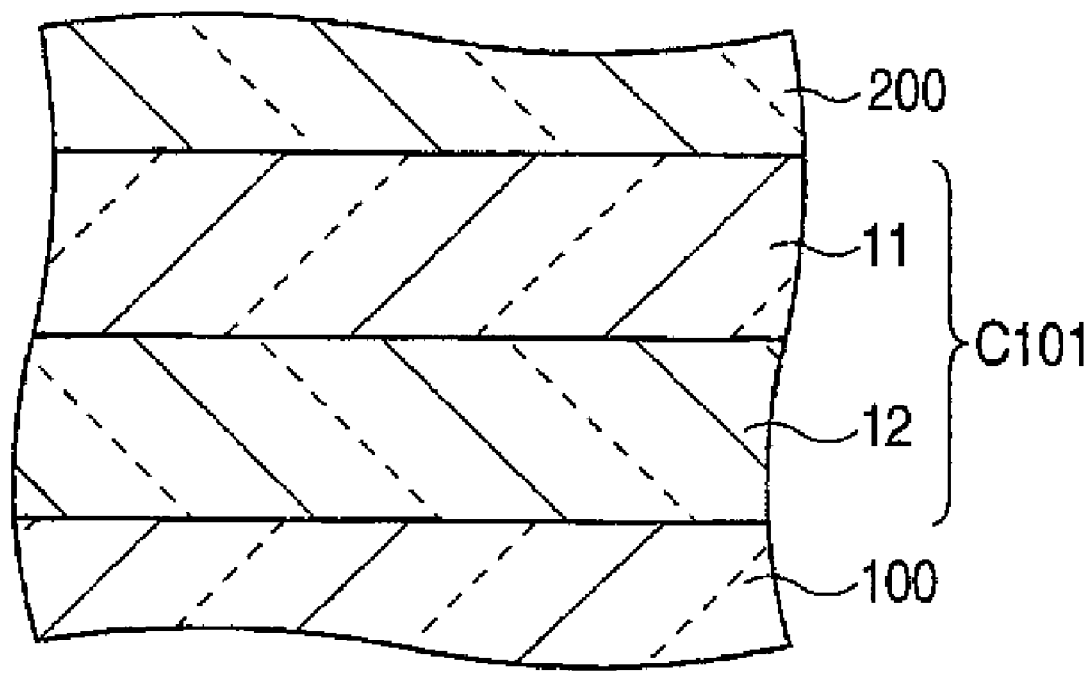
FIG. 18 is a cross-section view of an antireflection film as a comparative example.
Figure 19:
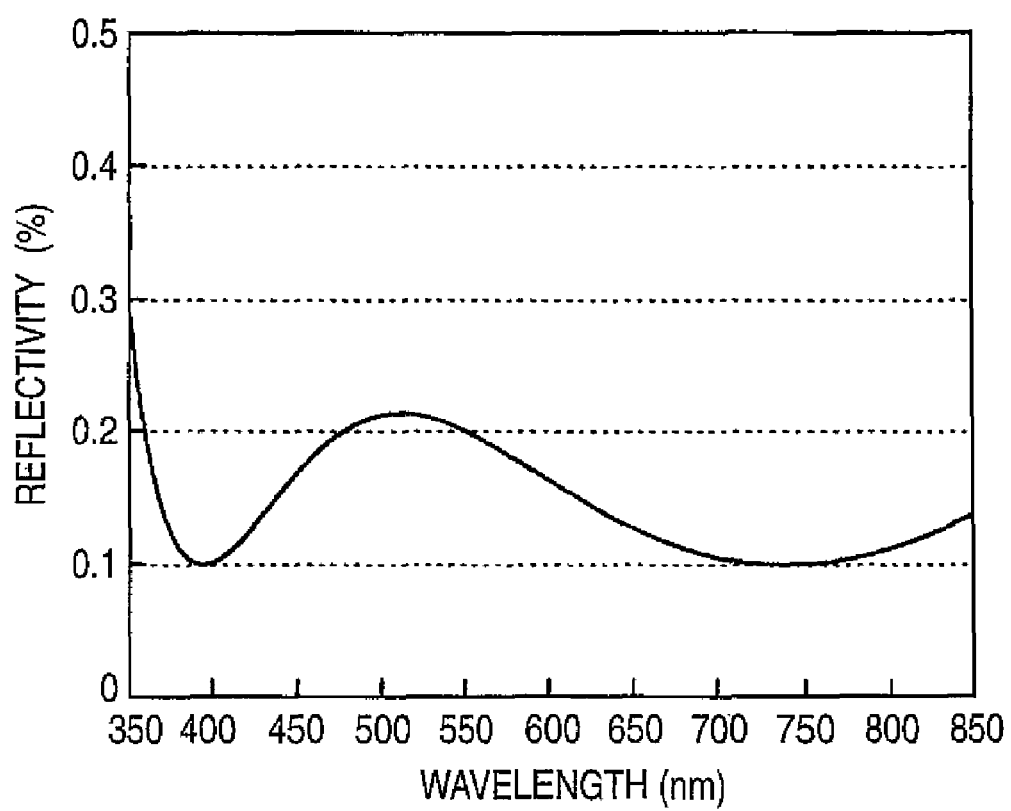
FIGS. 19A and 19B show basic data and reflectivity distribution of Comparative Example 1-1 corresponding to the antireflection film shown in FIG. 18.
Figure 20:
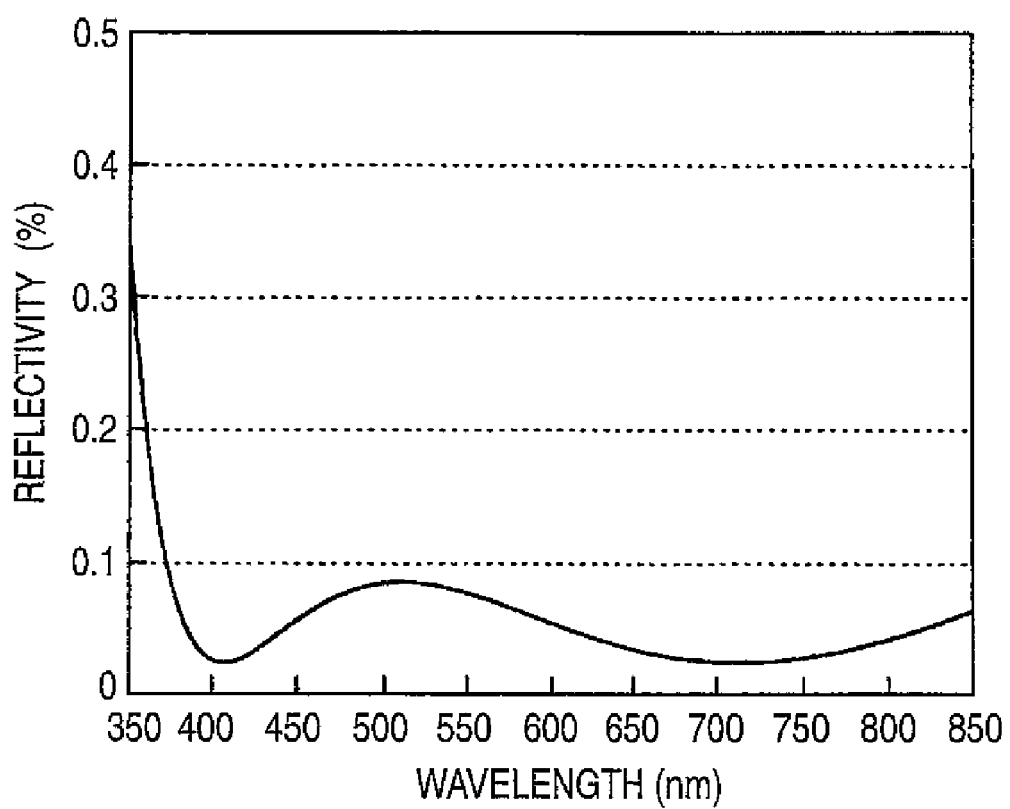
FIGS. 20A and 20B show basic data and reflectivity distribution of Comparative Example 1-2 corresponding to the antireflection film shown in FIG. 18.
Figure 21:
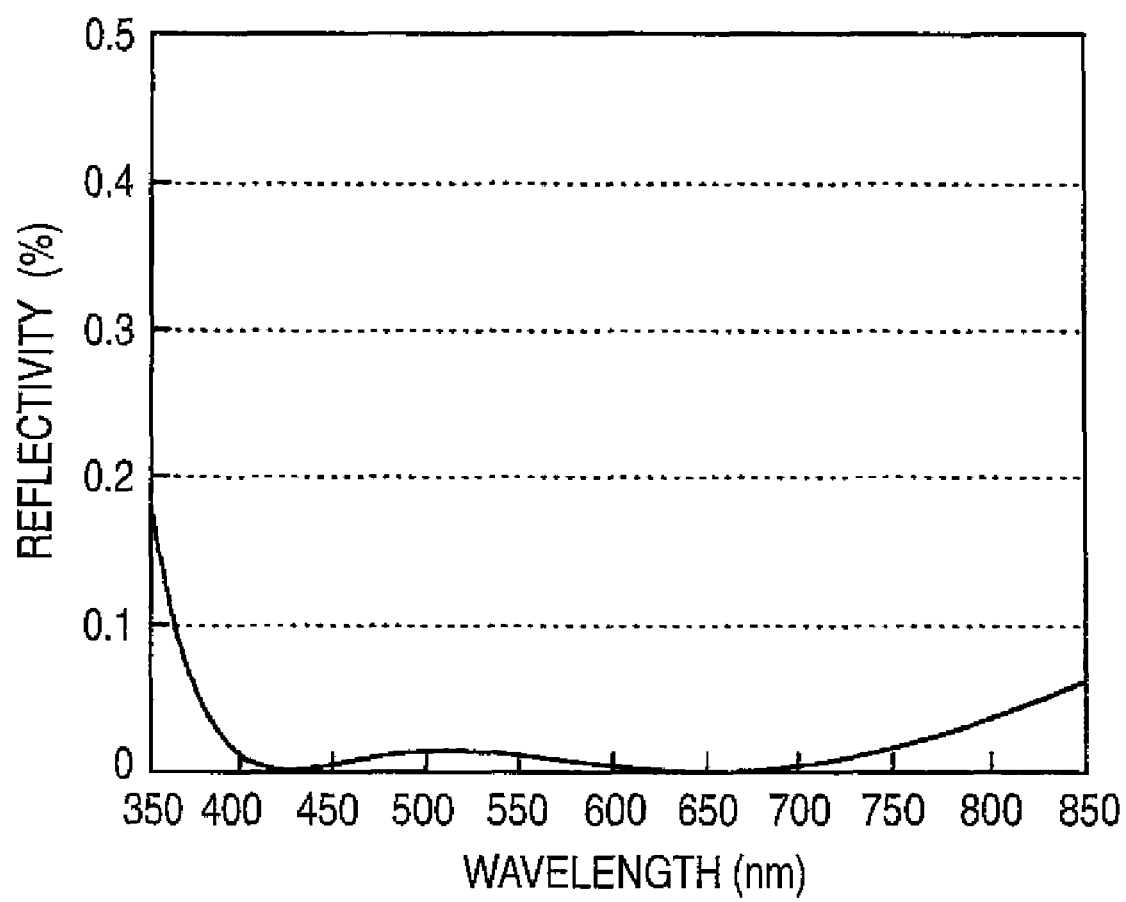
FIGS. 21A and 21B show basic data and reflectivity distribution of Comparative Example 1-3 corresponding to the antireflection film shown in FIG. 18.
Figure 22:
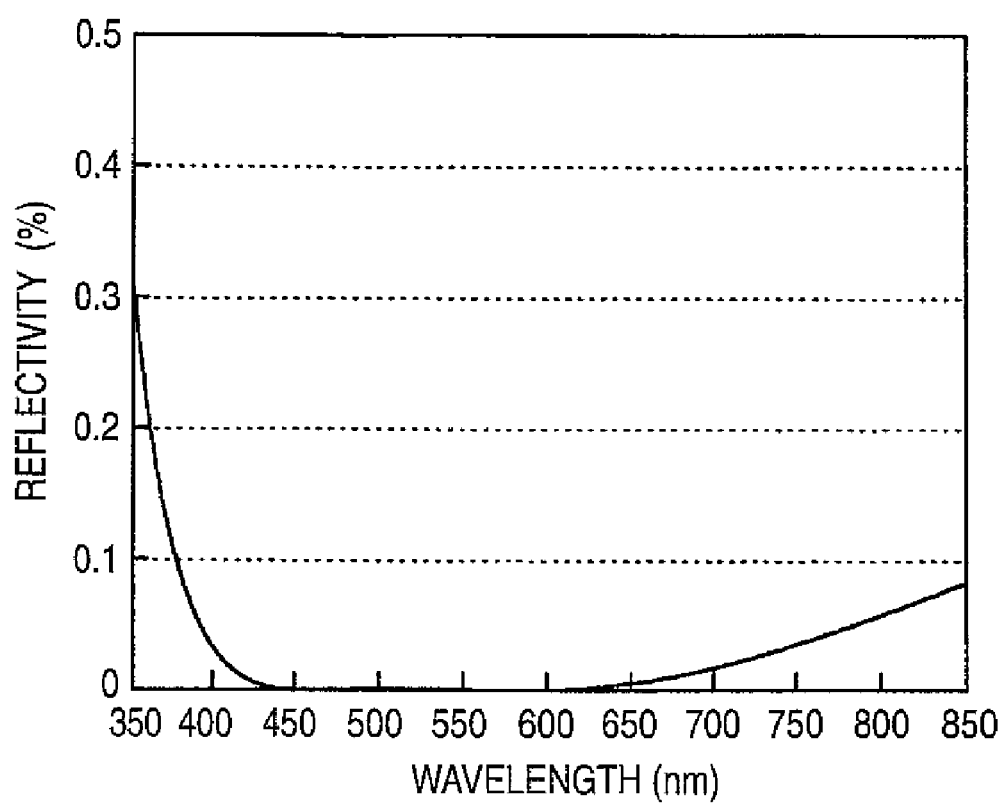
FIGS. 22A and 22B show basic data and reflectivity distribution of Comparative Example 1-4 corresponding to the antireflection film shown in FIG. 18.
Figure 23:
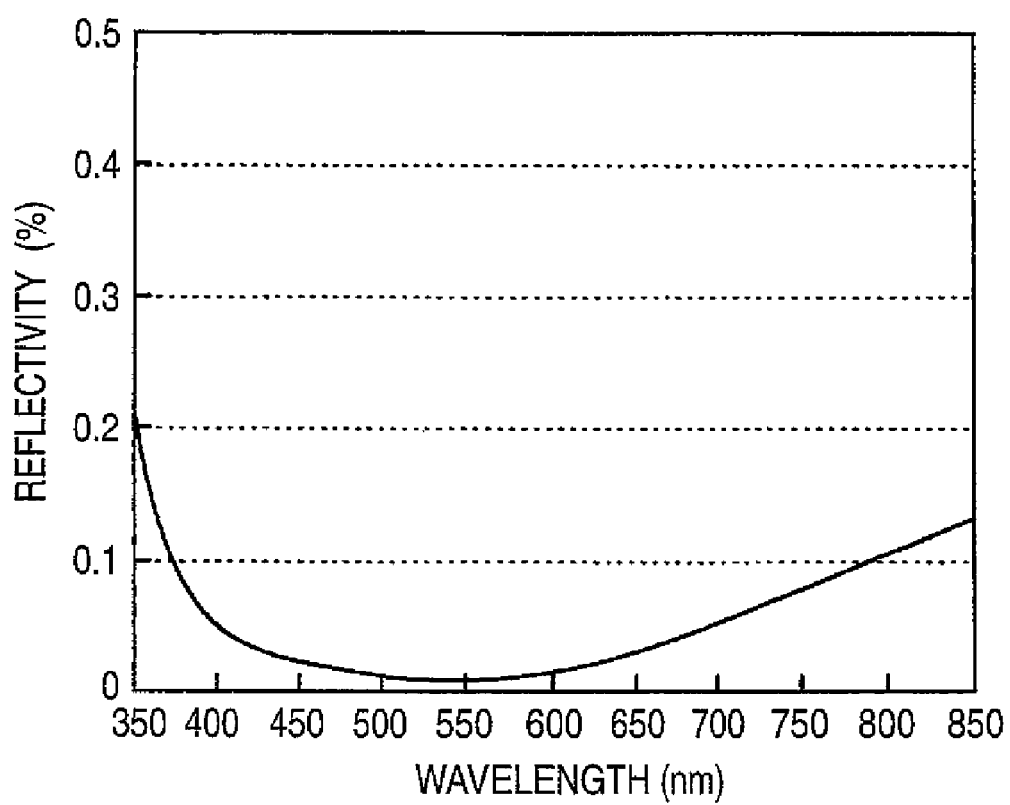
FIGS. 23A and 23B show basic data and reflectivity distribution of Comparative Example 1-5 corresponding to the antireflection film shown in FIG. 18.

FIGS. 19 to 23 show Comparative Examples 1-1 to 1-5, which have an antireflection film C101 shown in FIG. 18, as comparative examples with respect to the first and second numerical examples. In FIG. 18, the antireflection film C101 including first and second layers 11 and 12 has an intermediate refractive index between those of the optical substrate 100 and the adhesion layer 200, as a whole. Both of the first and second layers 11 and 12 are middle refractive index layers made of a middle refractive index material having a refractive index of 1.55 to 1.85 at the d line. Furthermore, the second layer 12 has a higher refractive index than that of the first layer 11. FIGS. 19(A), 20(A), 21(A), 22(A) and 23(A) are tables showing specific basic data of Comparative Examples 1-1 to 1-5. The first layer 11 is made of $Al_2O_3$, and the second layer 12 is made of a substance M2 (made by Merck & Co., Inc., Germany), indicated by 'sub-m2', which mainly consists of lanthanum aluminate ($La_2O_3.3.3Al_2O_3$). Further, the center wavelength λ·0 shown in the column of optical thickness N·d is set to 520 nm.

Figure 24:
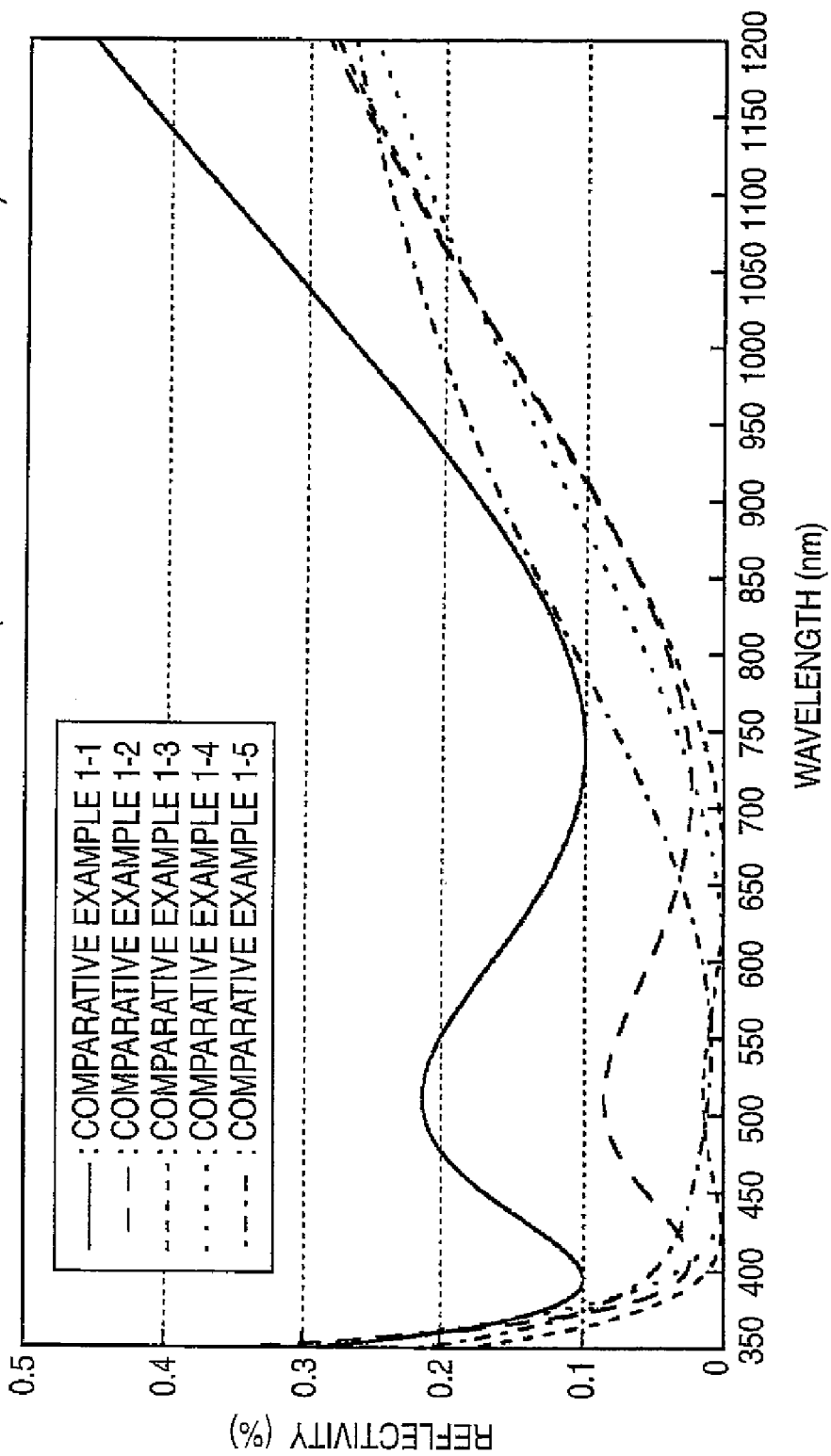
FIG. 24 is a characteristic diagram collectively showing all the reflectivity distributions of Comparative Examples 1-1 to 1-5 shown in FIGS. 19 to 23.

Meanwhile, FIGS. 19(B), 20(B), 21(B), 22(B) and 23(B) show the reflectivity distribution of Comparative Examples 1-1 to 1-5. FIG. 24 collectively shows the graphs of FIGS. 19(B), 20(B), 21(B), 22(B) and 23(B).

As is clear from the respective figures, the reflectivity in a band of 400 to 650 nm largely exceeds 0.02% in any of the comparative examples, except Comparative Example 1-4 in which the refractive index of the optical substrate 100 is equal to 1.85. Even in Comparative Example 1-4, the reflectivity at a wavelength of 400 nm exceeds 0.03%, and the reflectivity at a wavelength of 700 nm exceeds 0.01%.

Through the above-described basic data and the respective reflectivity distribution figures, it can be found that the reflectivity distribution in the examples is significantly improved in comparison with that in the comparative examples having the two-layer structure. That is, according to the antireflection film of the embodiments of the invention, it is possible to sufficiently reduce the reflectivity in a wider band than in the conventional antireflection film. Furthermore, the reflectivity distribution can be sufficiently flattened.

Although the invention has been described by exemplifying the embodiments and examples, the invention is not limited thereto. Various modifications may be made. For example, the reflective indices and the optical thicknesses of the respective layers and the respective substrates are not limited to those of the numerical examples, but other values may be used. Further, the materials composing the respective layers and the respective substrates are not limited to those of the numerical examples, but other materials may be used.

Furthermore, each layer may be composed of a plurality of films, based on an equivalent film theory. That is, by laminating two kinds of refractive index films symmetrically, they may optically behave as a single layer.

What is claimed is:

1. An optical element comprising:
an optical member;
another optical member;
an adhesion layer, wherein the optical member and the other optical member are bonded to each other through the adhesive layer; and
an antireflection film including a multilayer film having at least first to sixth layers that are disposed between the optical member and the adhesion layer, the first to sixth layers being laminated in order from one side of the adhesion layer, wherein
an equivalent refractive index of the entire multilayer film is lower than that of the optical member and higher than that of the adhesion layer, and
refractive indices of the second, fourth and sixth layers are higher than those of the first and third layers and lower than that of the fifth layer.

2. The optical element to claim 1, wherein the following conditional expressions (1) to (6) are satisfied:

$$0.06 \times \lambda 0 \leq N1 \cdot d1 \leq 0.11 \times \lambda 0 \quad (1)$$

$$0.07 \times \lambda 0 \leq N2 \cdot d2 \leq 0.13 \times \lambda 0 \quad (2)$$

$$0.06 \times \lambda 0 \leq N3 \cdot d3 \leq 0.18 \times \lambda 0 \quad (3)$$

$$0.31 \times \lambda 0 \leq N4 \cdot d4 \leq 0.43 \times \lambda 0 \quad (4)$$

$$0.04 \times \lambda 0 \leq N5 \cdot d5 \leq 0.09 \times \lambda 0 \quad (5)$$

$$0.06 \times \lambda 0 \leq N6 \cdot d6 \leq 0.18 \times \lambda 0 \quad (6)$$

where λ0 denotes a center wavelength, N1 to N6 denote refractive indices of the first to sixth layers at the center wavelength λ0, and d1 to d6 denote physical thicknesses of the first to sixth layers.

3. The optical element according to claim 1, wherein
the first and third layers are made of a low refractive index material having refractive index of 1.35 to 1.50 at d line,
the second, fourth, and sixth layers are made of a middle refractive index material having a refractive index of 1.55 to 1.85 at the d line, and
the fifth layer is made of a high refractive index material having a refractive index, at the d line, that is in a range of 1.70 to 2.50 and that is higher than that of the middle refractive index material.

4. The optical element according to claim 3, wherein
the low refractive index material includes at least one of $MgF_2$, $SiO_2$ and $AlF_3$,
the middle refractive index material includes at least one of $PrAlO_3$, $La_{2X}Al_{2Y}O_{3(X+Y)}$, $Al_2O_3$, $GeO_2$ and $Y_2O_3$, and
the high refractive index material includes at least one of $LaTi_2$, $ZrO_2$, $TiO_2$, $Ta_2O_5$, $Nb_2O_5$, $HfO_2$, and $CeO_2$.

5. The optical element according to claim 1, wherein
the multilayer film further comprises seventh and eighth layers that are laminated on an optical-member side of the sixth layer,
a refractive index of the seventh layer is higher than those of the first to fourth and sixth layers, and
a refractive index of the eighth layer is higher than those of the first and third layers and is lower than those of the fifth and seventh layers.

6. The optical element according to claim 5, wherein the following conditional expressions (7) and (8) are satisfied:

$$0.05 \times \lambda 0 \leq N7 \cdot d7 \leq 0.14 \times \lambda 0 \quad (7)$$

$$0.04 \times \lambda 0 \leq N8 \cdot d8 \leq 0.07 \times \lambda 0 \quad (8)$$

where λ0 denotes the center wavelength, N7 and N8 denote refractive indices of the seventh and eighth layers at the center wavelength λ0, and d7 and d8 denote physical thicknesses of the seventh and eighth layers.

7. The optical element according to claim 5, wherein
the first and third layers are made of a low refractive index material having a refractive index of 1.35 to 1.50 at d line,
the second, fourth, sixth, and eighth layers are made of a middle refractive index material having a refractive index of 1.55 to 1.85 at the d line, and
the fifth and seventh layers are made of a high refractive index material having a refractive index, at the d line, that is in a range of 1.70 to 2.50 and that is higher than that of the middle refractive index material.

8. The optical element according to claim 1, wherein
the optical member has a refractive index of 1.75 to 2.10 at the d line, and
the adhesion layer has a refractive index of 1.45 to 1.60 at the d line.

9. The optical element according to claim 1, wherein
the other optical member has a refractive index of 1.75 to 2.10 at the d line, and
the optical element further comprising:
another antireflection film between the other optical member and the adhesion layer, wherein
the other antireflection film includes a multilayer film having at least ninth to fourteenth layers that are disposed between the other optical member and the adhesion layer, the ninth to fourteenth layers being laminated in order from the other side of the adhesion layer, wherein
an equivalent refractive index of the entire multilayer film of the other antireflection film is lower than that of the other optical member and higher than that of the adhesion layer, and
refractive indices of the tenth, twelfth and fourteenth layers are higher than those of the ninth and eleventh layers and lower than that of the thirteenth layer.

10. An optical system comprising the optical element according to claim 1.

* * * * *